United States Patent [19]

Swain

[11] 4,045,721

[45] Aug. 30, 1977

[54] ELECTRO-CHEMICAL CONCENTRATION TRANSDUCER AND ITS USE TO MEASURE AND CONTROL ACID STRENGTH AND STORAGE BATTERY CHARGE

[76] Inventor: William H. Swain, 4662 Gleason Ave., Sarasota County, Fla. 33581

[21] Appl. No.: 537,704

[22] Filed: Dec. 30, 1974

[51] Int. Cl.² .................. H02J 7/00; G01N 27/26
[52] U.S. Cl. ............................ 320/43; 204/195 R; 324/29.5
[58] Field of Search ............ 324/29.5, 30 B, 30 C, 324/29, 30 R; 204/1 T, 195 R, 195 F, 195 G, 195 P; 320/2, 4, 43, 48; 136/182

[56] References Cited

U.S. PATENT DOCUMENTS

| | | | |
|---|---|---|---|
| 1,988,192 | 1/1935 | Drabin | 320/43 X |
| 2,844,532 | 7/1958 | White et al. | 204/195 G |
| 3,461,055 | 8/1969 | Staunton | 204/195 F |
| 3,505,195 | 4/1970 | Nielsen et al. | 204/195 P |
| 3,810,828 | 5/1974 | Lindholm | 204/195 F |

OTHER PUBLICATIONS

"Performance and Application of a New Reference Electrode for Process Potentiometric Measurements," R. Murtineti & Jones; ISA Transactions, vol. 1, No. 1; (1970) pp. 90, 91.

*Primary Examiner*—Robert J. Hickey

[57] ABSTRACT

A simple and rugged transducer has an electric potential output which is a measure of the concentration of a sensed sulphuric acid. The small temperature coefficient of potential is linear and correctable. The resistance of the transducer is a strong and negative function of temperature. It is used to measure electrolyte temperature and to compensate variable characteristics of batteries and reagents.

A battery is automatically charged in 2½ hours. Both transducer potential and resistance are used in a new and doubly responsive closed loop system which regulates charging current so that it is as high as can safely be used.

A battery gage conveniently shows available charge or energy at the present temperature of the battery.

Chemical reagent strength is measured and controlled.

The transducer uses the discovery that an electric potential of 40 millivolts exists between two electrodes — one in contact with the electrolyte of a fully charged lead-acid cell, and the other in contact with the weaker electrolyte of a discharged cell — when the electrolytes are electrolytically joined by an electrolyte in an insulated container constructed to prevent mixing of the electrolytes. The strength of different types of electrolytes is sensed in a similar structure.

Theory is given and preferred transducers are described. These are matched to measuring and controlling instruments using an improved method and integrated circuit amplifier.

15 Claims, 10 Drawing Figures

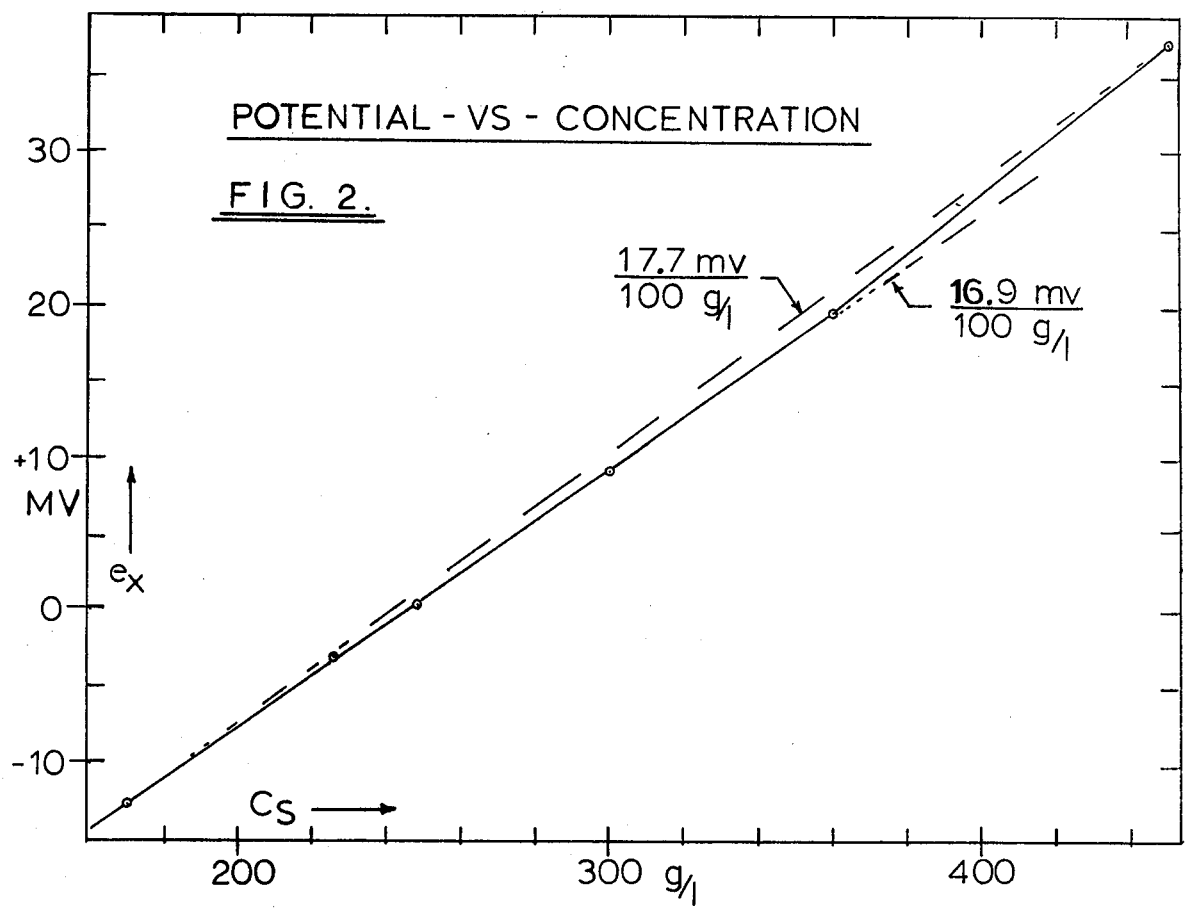
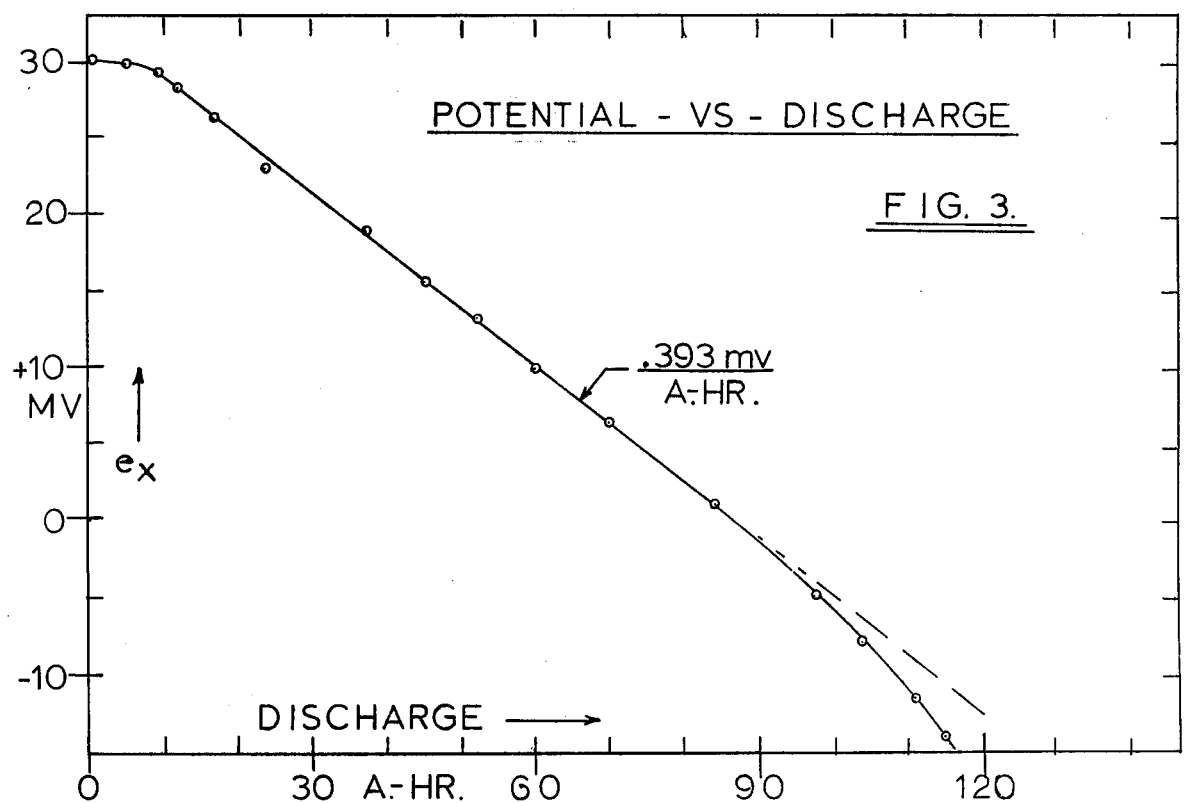

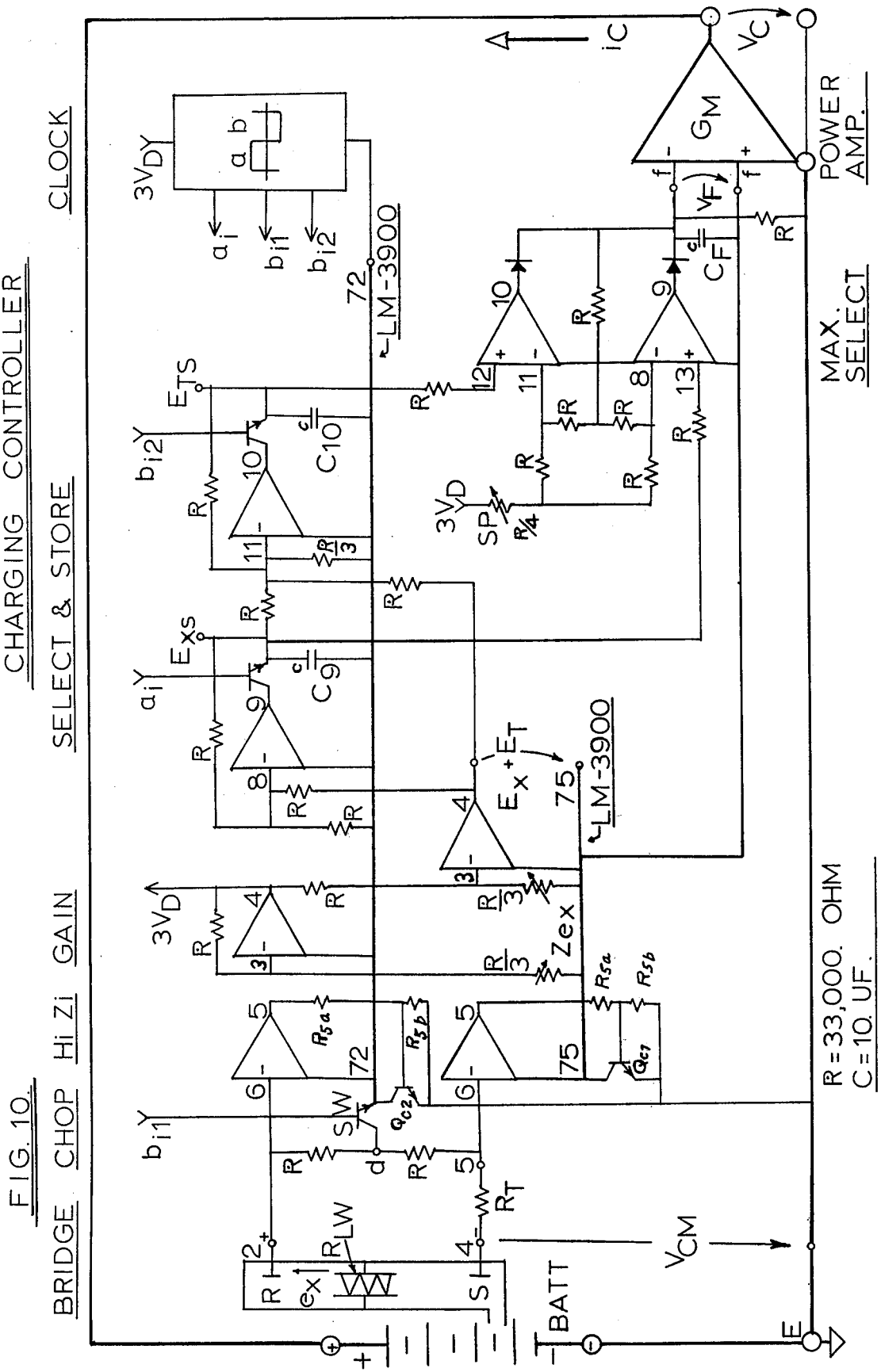

ELECTRO-CHEMICAL CONCENTRATION TRANSDUCER AND ITS USE TO MEASURE AND CONTROL ACID STRENGTH AND STORAGE BATTERY CHARGE

1. BACKGROUND OF THE INVENTION

Sulphuric acid is widely used as an industrial reagent and as the electrolyte in lead-acid storage batteries. A sensor for translating acid strength directly into a proportional electric potential can be used to better measure and control both chemical activity and battery charge, especially when the resistance of the sensor is a measure of the temperature of the sensed electrolyte.

Acid concentration and temperature are generally considered the best indications of battery state, so this transducer is for use in an energy gage or charger for battery powered vehicles, fork lifts, uninterruptable power supplies and unattended instrumentation systems.

I considered a number of ways of making a transducer, and in the process discovered that there is about 40 millivolts direct current potential between identical electrodes in electrolytes of differing concentration, corresponding to that in charged and discharged lead-acid storage batteries. While other approaches had some serious difficulty such as instability or sensitivity to temperature or acid, it was learned that with proper selection and treatment of materials, one can construct a reliable and accurate concentration transducer, which is stable with temperature and may be be used when the battery is carrying a large current.

While the electric potential is thermally stable, the electrolytes need to be joined by a capillary tube containing a joining electrolyte, and this will necessarily have an electrical conductance which is highly dependent on temperature. The function will be strong and definite if the container of the joining electrolyte is dimensionally and chemically stable. This is an advantage because the internal temperature of a battery strongly influences the stored charge, safe charging current, and longevity. Moreover, there is good correspondence between electrolyte conductivity and stored charge. Good temperature compensation is obtained with this transducer.

Transducers have been constructed to directly drive an an acid concentration or charge indicator, or a controller. But these are too large for some applications, so a potential amplifier is frequently used, especially when good temperature compensation is required. An unusually cost effective integrated circuit amplifier, based on a new design approach, is shown connected to a small transducer.

1.1 FIELD OF THE INVENTION

This invention concerns an electro-chemical transducer which has an electric potential output proportional to the difference between the concentrations of two electrolytes. The electrical resistance of the transducer can also be a strong and definite function of a temperature. More specifically, this invention relates to method and means for both measuring and controlling electrolyte concentration, or stored energy in an electric cell. It is particularly applicable to sulphuric acid, and also to lead-acid storage batteries.

The invention is basically a proportional electric comparitor of strong electrolytes. A sensor or transducer is made by placing a sensor electrode in a sensed electrolyte, and a reference electrode in a stable electrolyte, and electrically connecting the electrolytes with a capillary joining electrolyte. The sensed concentration can be measured if the transducer is calibrated. This can be done by using known materials in a standardized process, or by measurements of electric potential corresponding with electrolytes of known strength. A control system can be governed by a transducer or sensor, so it is practical to automatically regulate the concentration of a sensed electrolyte, such as sulphuric acid.

This transducer is ordinarily constructed so that its electrical resistance is proportional to the resistivity of the joining electrolyte. Since its temperature generally tracks the temperature of the sensed electrolyte, the resistance is a measure of the thermal state of the sensed electrolyte.

What is described is a general purpose sensor or transducer, having application where there is need to measure or control concentration and temperature of an electrolyte.

The activity of sulphuric acid can be judged from a knowledge of its concentration and temperature, so this transducer is for industrial application where this acid appears in water solution.

The concentration of sulphuric acid in the electrolyte of a lead-acid storage cell is of special interest, because the acid lost during discharge is in exact proportion to the ampere-hour discharge. And conversely, the acid added to the electrolyte during charge is in exact proportion to that part of the charging current which is used to restore chemical energy to the cell. It will also be remembered that effects, such as sulphation and local action can cause a cell to not absorb a full charge, or to loose charge while at rest, and that these problems tend to increase with age. However, such problems are generally manifest by low concentration, so weakening cells can be detected by measuring concentration.

Whether on load or charge, the best indicator of the state of a cell is the state of its electrolyte. But a knowledge of its temperature is also important.

When a cell is on heavy discharge at freezing temperature it can appear to have lost up to $\frac{1}{3}$ of its charge, and cell resistance will have increased. This reduces load voltage and consequently the available energy. Yet the concentration of the electrolyte will be essentially unchanged. Moreover, when a cell is on charge, its voltage is a function of both the charge state and the internal temperature. Charging voltage increases about 20% with charge state, but decreases as much as 12% with increased temperature. This is a problem in regulators governed by cell voltage. And also on charge, the electric energy delivered to a battery is only partly converted to chemical energy. This has the dual effect of making it uncertain how much energy has been stored in the cell, and also of generating heat, so that the internal temperature of the cell can rise rapidly and dangerously, and in a manner unrelated to the temperature outside the cell.

1.2 PRIOR ART

Nernst and others, Ref. C., reported work done before the year 1911 on a concentration cell. Professor Carhart, ibid, says; "In the extreme case in which there is no chemical energy to convert into work, the cell becomes a device for conversion of heat alone into the energy of the currrent. . . . Thus, when two electrodes of the same metal are immersed in a solution of a salt of this metal, the concentration of the solution at one electrode being greater than the other, the cell has a small electromotive force which will produce a current. When the solutions are so dilute that there is no further heat of dilution, . . . ." He then gives the Nernst equation for a concentration cell, which has a potential proportional to absolute temperature, and to the log of the ratio of the concentrations of a metal salt in which the metal electrodes are immersed. A FIG. 16 shows zinc electrodes in two solutions of zinc sulphate having a concentration difference, and a resulting electric current.

This heat-to-energy cell does not appear to have been constructed to operate as a sensor or transducer. Several reasons for this seem apparent.

A real difficulty is the restriction to the use of "disolved salts" of the electrode material in the cell. Investigators interested in sensing the strength of sulphuric acid disolved in water- with no significant quantity of salt present- would apparently not expect to find a potential proportional to a concentration differential.

The concentration cell was apparently constructed as an experimental reference for theoretical studies of heat and energy, and as a possible source of electric power directly from heat. The use of much diluted solutions required large electrodes, and also a large porous partition joining the electrolytes, to reduce the resistance to an electric current needed to get energy out. Large electrodes tend to have a long term change in potential due to local action and gas accumulated when a current flows, and they are not readily protected from pollutants and deposition of salts, which can also change their potential. And further, the use of a large porous partition established a condition for rapid diffusion of the constituent of the stronger electrolyte into the weaker electrolyte, and reduced the potential with time.

A serious difficulty was ". . . the concentrations are equalized by the flow of current, and there is no further electromotive force." It would be supposed that a small measuring current, continued over an extended time, would act to equalize the concentrations, and thus damage a gage.

And persons considering a concentration gage would not prefer a potential which is " . . . proportional to the absolute temperature of the cell.", ie, has a $+0.3\%/C°$ temperature coefficient. Also, the non-linear dependence of the potential on the log of the concentration ratio would be considered a difficulty.

These and other difficulties are largely overcome by the present invention. It provides for a sensor having a practically linear response to a concentration difference in strong electrolytes, which are not restricted to salts of the electrode's material, which has a small and linear negative temperature coefficient of potential, and in which there is thus far, no evidence that the concentrations are equalized by a measuring current continued for a long time.

There are likewise difficulties in the use of a pH measuring apparatus to sense a concentration difference. Cost is an important one, for the pH apparatus commonly seen is sensitive, rather complex to build, and delicate to use. It may require periodic adjustment or recalibration. And more importantly, it is believed to be rather insensitive to a change in concentration of a strong electrolyte. A most serious objection is that it measures hydrogen ion concentration — not the mass per unit volume of a constituent in an electrolyte, which is a measure of the strength of a reagent, or of the state of charge of a battery. The structure is complicated by the usual need for a hydrogen electrode, a calomel electrode, and a solution of potassium chloride, which could be a hazard to an electric cell. It is not much used as a concentration gage.

The transducer of this invention avoids these difficulties, and provides a relatively accurate, simple, and rugged way to sense concentration differences in strong electrolytes, whether or not they contain disolved salts. And this can be done at modest cost.

This invention is particularly useful in sensing the concentration of an electrolyte, and thus the state of a battery. The prior art relating to measurement and control of battery charge includes the following devices and techniques.

Prior Battery State Sensors

It has been reported that charge can be measured and controlled using a sensor of the incremental resistance of the battery, and this is said to be a reasonably good indicator of the battery state. However, these are not widely used, probably because they lack accuracy, especially when the battery is under load. Other transducers, based on a sensing of the electrical capacitance or physical forces in the battery, are probably disturbed by the physical stresses common in an electric vehicle. And there are a variety of ways for sensing the conductivity of the electrolyte, and converting this to an electric signal, but there are two problems with this approach. Conductivity is highly dependent on temperature, and it is also a U-shaped function of concentration, with a maximum at a concentration corresponding to about 60% of full charge. This approach has not been widely used.

However, it will be remembered that the hydrometer really works. Hydrometers are widely used to measure the state of lead-acid batteries because their indication of specific gravity is closely related to the concentration of sulphuric acid, which is the principal constituent in the electrolyte. A hydrometer reading taken by a skilled person may be converted to a measure of charge state with reasonable accuracy when corrected for temperature and certain battery characteristics. However, hydrometers are not used as often as desired, because it is inconvenient to get at the acid and correctly use the hydrometer without spilling on sensitive surfaces, especially when the vehicle is in motion. A skilled operator is also generally required.

What is wanted for measurement is an instrument panel indication of available electric energy, like the gas gage usually found in automobiles. And what is wanted for charge control is a transducer which governs the battery charger like a float valve governs the filling of a water tank.

A voltmeter connected across the battery terminals has been used in an effort to show charge state, but those skilled in the art generally consider it to be nearly useless. But despite this, battery voltage is still widely used to govern the action of temperature compensated battery chargers. The result appears to be rather ineffective charging under many circumstances, partly because the temperature reference is generally anything but the internal cell temperature, and also because of the dependence of the final charging voltage on the charging current history, and on the condition of the negative plate material, and impurities in the electrolyte. While widely accepted as the best available economic solution, charging voltage appears to be fundamentally inadequate as a governor of charging apparatus.

Acceptable state-of-charge indicators have been constructed using coulombmeters of various types. These are arranged to measure the ampere-hours put into the battery — often with a fixed factor to take into account a wasted part of the charging current — and then to substract out the charge removed during use. However, these coulombmeters have a number of disadvantages, in addition to the relatively high cost for both the instrument, and its companion current sensing shunt resistor. They do not show the effect of temperature inside the battery, or the charge lost inside the battery as a result of sulfation, local action, internal leakage, or low electrolyte level. And their accuracy is further reduced by the fact that part of the charging current is wasted in generating a gas, and heat, and this portion is variable with charging current and history. This may explain why there is little evidence of the use of coulombmeters to govern battery chargers.

Electronic amplifiers of excellent quality are available for matching the transducer of this invention to an indicator or to a controller. However, those considered were either costly, or complicated by a need for a special power supply.

These difficulties have been largely overcome by the transducer of the present invention, and also by the means provided for matching the transducer to an indicator, or to a controller of charge.

1.3 OBJECTS OF THE INVENTION

The general object of this invention is to provide method and means for constructing and using a transducer for sensing a concentration difference between two electrolytes; which has an electric potential output proportional to the concentration difference, with or without a disolved salt, particularly when the electrolytes are sulphuric acid.

It is an object of this invention to facilitate the measurement and the control of the concentration of the primary constituant of an electrolyte, and also the temperature of the electrolyte.

Another object of this invention is to provide method and means for constructing and using an electro-chemical transducer for measuring and controlling the concentration and temperature of sulphuric acid.

Still another object of this invention is to provide a structure and method for sensing the concentration of a strong electrolyte, and for producing a proportional electric potential output which is stable with temperature, and also to provide a resistance which is a measure of the temperature of a sensed electrolyte, especially when it is sulphuric acid, and further, when the electrolyte is the electrolyte of a lead-acid cell, in which case the conductance of the sensor corresponds to the thermally dependent characteristics of the cell, and moreover, the potential is practically invariant when an electric current flows in the sensed electrolyte.

A further object of this invention is to provide method and means for constructing and using an electro-chemical transducer for sensing the state of a lead-acid storage battery and governing a state indicator, or a charge controller.

An additional object of this invention is to provide method and means for constructing a proportional closed loop charging system, which quickly and safely charges a lead-acid storage battery.

A still further object of this invention is to provide an improved solid state amplifier suited for matching the transducer of this invention to means utilizing its electric output.

These and other objects of this invention will become apparent from the following summary of the invention, and moreover, from a more detailed description, which is best read in conjunction with the drawings, which are briefly described in the following section 3.

2. SUMMARY OF THE INVENTION

This invention may be broadly outlined as a method and means for making, calibrating, and using a transducer which converts a difference in concentration between two electrolytes to an electric potential having magnitude and polarity proportional to the concentration differential. The electric potential output is observed to exist between an electrode in one of the electrolytes and another electrode in the second electrolyte, when the two electrolytes are electrically joined by a third electrolyte, contained so that the first two do not readily mix.

Since a transducer should match both the sensed electrolyte and the means utilizing the electric output, there will be many different transducer designs.

A particular type of *TRANSDUCER* for sensing the concentration of a reagent electrolyte, by comparing it with a stable sample, can be briefly described in terms of sub-assemblies which are apparent on the left hand side of FIG. 1.

1. The REFERENCE, which includes a closed container mounting an electrode coupled to a transducer terminal, and a stable electrolyte in contact with the electrode, and a joining electrolyte;
2. the LIQUID WIRE, which includes a tube of insulating material largely filled with a porous or capillary insulating material, arranged to provide an open connecting path between the reference and the sensor, and contain the joining electrolyte, which provides an electrolytic path for a small measuring current which flows from the reference electrode and electrolyte and on to the sensed electrolyte; and
3. the SENSOR, which includes a sensor electrode coupled to another transducer terminal, and in contact with the sensed electrolyte in its container.

It will be seen that the liquid wire can be replaced by a partition common to the reference and sensor containers, having a small opening filled with a porous or capillary insulating material. The parts of the liquid wire are inert in the electrolyte used.

The three electrolytes are generally the same electrolyte, but they will ordinarily have a differing concentration. The electrolyte potential is independent of the electrolyte volume and electrode area. Ordinarily the volume is large, and the electrodes are small. When it is desired to sense the temperature of the sensed electrolyte, the liquid wire, or its porous partition equivilant, is constructed to be dimensionally stable and chemically inert, and it is thermally coupled to the sensed electrolyte. It may also be constructed to have a relatively high resistance. Then the transducer terminal resistance will be a measure of the resistivity of the joining electrolyte, and thereby the temperature of the sensed electrolyte.

A number of different electrolytes, including copper sulphate and salt water, can be sensed using this same general structure. Compatable electrode and insulating materials need to be used in each case.

Sulphuric acid has been used with good results in a number of differing transducer structures. When used with properly treated sponge lead electrodes, and nylon fiber capillary material, the potential output is essentially independent of temperature. The zero drift is very small, and a typical temperature coefficient of transfer gain is $-0.1\%/C°$; potential decreasing linearly with increased temperature. The electrode in the more concentrated acid is the negative electrode. The terminal resistance in a properly constructed transducer will about double when the temperature of the transducer changes from 120° F to 30° F.

2.1 METHOD DISCUSSION.

The following methods include necessary and unique steps for obtaining an electric potential proportional to concentration. They involve placing electrodes in electrolytes and electrolytically joining the electrolytes, to provide for a small measuring current, while preventing mixing.

The "such as" statements indicate areas wherein there are several adequate proceedures. The choice will be generally made after considering economic factors or application specifications, so the selection is not made here.

The "preferably" steps are generally given to provide for an improved article of manufacture. But this may not be needed. For example, really good thermal structural stability is of little value in a concentration gage of section 4.2 which uses an amplifier of section 4.5, but it is of real importance in a temperature compensated battery gage of section 4.2. And further, electric shielding and sensor protection can be valuable in a battery charging current regulator application, but unnecessary in a concentration gage exposed to only clean reagent in a storage tank.

These methods include steps unique to this invention, but omit some details covered in following sections of this specification, some of which will be understood by persons experienced in both the theory and practise of electro-chemistry. Knowlton, Ref. A., in following section 4.1, discusses cadmium electrodes in his paragraph 86, and lead electrodes in paragraph 40. It is expected that cadmium will operate in the method of section 2.1, and it is known that properly treated sponge lead and lead peroxide will function as noted in sections 4.3 and 4.2. This section also describes the acid, nylon or porous material, and a good many other details of construction and use.

The more general method of section 2.2 will be seen to include the transducer apparatus shown in sections 4.3 and 4.4, as well as many alternate forms. I have in mind using the sensor in a storage tank or pipe containing sulphuric acid reagent, and also in the electrolyte of a lead-acid cell.

2.2 A METHOD OUTLINE

A particular method for sensing the concentration of a sulphuric acid electrolyte, and obtaining a proportional output potential, may be said to include the following outline steps:
 select a compatable electrode material, such as lead;
 form a small reference electrode and a small sensor electrode, and couple each one to its own terminal using insulated wire;
 cement two plastic beakers together so as to form a partition common to both;
 drill a small hole through, and half way up the common partition;
 tightly fill the hole with nylon fibers, and thereby finish making the liquid wire or joining container;
 place one electrode in each small container;
 fill the reference beaker with 450 gram per liter sulphuric acid electrolyte; and
 fill the sensor beaker with the sensed sulphuric acid electrolyte.

2.3 A METHOD

What follows is a more general and detailed statement of steps included in a method of making a particular kind of transducer of the present invention. Those skilled in the art will recognize that it is not feasable to here give all those steps which are learned in the practise of the art, and also in making a number of transducers.

A part of this invention may be described as a method for sensing the concentration of a sensed sulphuric acid electrolyte in a sensed container, by comparing it with a stable reference electrolyte, to obtain an electric potential output which is proportional to a concentration difference. This method includes the steps of:
 selecting an electrode material, such as dry charged sponge lead or lead peroxide, which has not been wet and allowed to dry in air, and is inert in sulphuric acid;
 constructing two small electrodes using the same material and process for each one, so as to provide a surface area for contact with an electrolyte, and to provide a coupling for each one to a terminal, and to insulate the surface of the coupling, and in addition, substantially all of any extraneous conducting material associated with the electrodes;
 constructing a reference container to hold the stable reference electrolyte and to generally exclude pollutants and prevent evaporation or loss of electrolyte, and to have a small opening matching a joining container, which will have a joining electrolyte, so that in a later filling step the reference electrolyte will contact the joining electrolyte, and to hold one of the two electrodes, which becomes the reference electrode, so that a surface area will contact the reference electrolyte, and to provide for the coupling to a reference terminal outside the container;
 constructing an open joining container of insulating and preferably thermally stable material to have two ends — one matching the small opening in the reference container, and the other adapted to an opening in the sensed container — and to contain a quantity of porous or capillary insulating material which is inert in sulphuric acid and preferably thermally stable, and which is also adapted to contain a small quantity of the joining electrolyte in a manner such that, after the joining electrolyte is later added, a small measuring current can flow from end to end, but to generally prevent mixing of electrolytes which will later be placed in the containers at the ends, and which is further adapted to prevent a gas bubble from later blocking the flow of measuring current, either at the matching ends or in between;
 constructing means adapting the sensed container to the joining container end so that the sensed electrolyte will make contact with the joining electrolyte in a later filling step, and also means adapting and holding a second of the two electrodes, which is the sensor electrode, so that a surface area will contact the sensed electrolyte, and to provide for the coupling to the sensor termianl outside the sensed container, the means holding the sensor electrode preferably constructed to position the sensor electrode adjacent to the end of the joining container, and to protect the sensor electrode from gas and pollutants which may later be in the sensed electrolyte, while admitting some sensed electrolyte to contact with a surface area of the sensor electrode through ventilation holes, so that a changed concentration will be sensed in a reasonable time, and also to electrically shield the sensor electrode and the associated end of the joining container from electric fields which may occur in the sensed electrolyte as a consequence of large electric currents therein, and to thereby largely prevent an extraneous potential output;

preferably preactivating the reference and the sensor electrodes by immersing them in sulphuric acid as strong as the strongest acid to be later used, for a time sufficient to complete all release of gas and associated initial reactions, and thereafter keep the surfaces wet with acid;

assembling the reference electrode in the reference container so as to bring out the coupling to the external reference terminal, and then sealing the container;

assembling the reference container to the joining container so that the matching sector is sealed against gas and liquid, and is preferably fully insulated against electric current;

assembling the sensor electrode to the means holding, protecting and adapting, so as to bring out the coupling to the external sensor terminal;

assembling the sensor means holding, protecting and adapting to the joining container, preferably so that the matching sector is sealed against gas and liquid and electric current;

filling the reference container with the stable reference sulphuric acid, which preferably has a concentration within the bounds of the concentrations to be sensed, with greater preference given to the use of the minimum concentration, preferably by making a small hole in the reference container to match the needle of a syringe, and then forcing the electrolyte into the reference container under pressure, drawing out gas, and repeating forcing, until the reference container is full of electrolyte, and also the electrolyte has been forced through the full length of the open joining container, thereby completely filling it with joining electrolyte, and then sealing the hole closed;

placing the sensor electrode means holding, protecting and adapting in the sensed container means adapting; and filling the sensed container with the sensed electrolyte.

2.4 APPLICATIONS OF THE TRANSDUCER

This transducer is, of itself, an article of manufacture. But it may be included as a component in other articles of manufacture. The nature of a transducer generally determines its use.

This transducer is primarily an electric sensor for strong electrolytes. Its value is in the reliable and accurate electric output proportional to a concentration difference, obtained from a simple and rugged sensor which should be economical to construct.

The thermal stability of the potential output is good, and the small change in transfer gain is apparently a linear and compensatable function of temperature. The terminal resistance is a strong and generally negative function of temperature, which tends to — and should, well match and compensate for the thermally dependent characteristics of a lead-acid battery.

The same basic sensor is observed to operate with other electrolytes such as copper sulphate and salt water, and there is reason to expect that the list of operable electrolytes is a long one, and includes many reagents used by manufacturers of chemicals and electric cells.

In addition to detailing the transducer, this specification includes a design approach and specific data relating to several forms of a:

concentration gage for measuring the strength of sulphuric acid;

battery gage for measuring the charge or energy stored in a lead-acid cell;

charging current regulator for lead-acid batteries; and amplifiers for matching the transducer to devices governed by its potential.

There will be many more applications for the basic sensor, but it is not feasable to list them all here.

3. BRIEF DESCRIPTION OF THE DRAWINGS

The objects of the invention stated in paragraph 1.3, as well as still other and further objects and benefits, will be apparent from the descriptions in the following section 4, which is taken in conjunction with the accompanying drawings, wherein:

FIG. 1 is a schematic representation of a transducer associated with a lead-acid storage cell. Apparatus for measuring concentration, and indicating the electric output of the transducer, is shown schematically, together with other devices for battery state calibration by a known charge or discharge. Alternative use of the transducer in a closed loop charge control apparatus is represented near the top of the figure;

FIG. 2 is a graphic respresentation of measurements relating transducer electric potential output to the concentration of the sensed electrolyte. It was made using the appropriate parts of the apparatus shown in FIG. 1;

FIG. 3 is a graphic representation of measurements made during the discharge of a battery with potential charge state indicating apparatus shown in FIG. 1;

Figure 9:
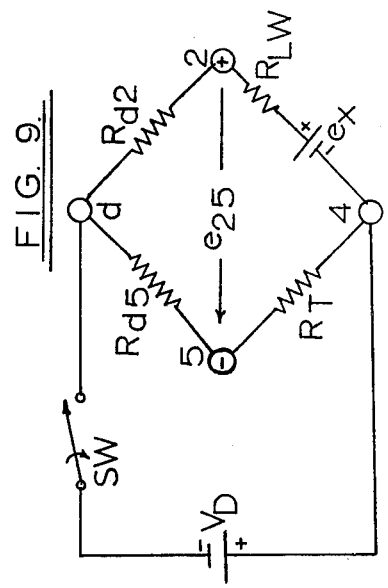

FIG. 9 is a schematic representation of a transducer having terminals 2 & 4, and connected in a bridge circuit, adapted to providing two — time sequential and alternating — outputs inditicative of both potential and resistance. This is particularly useful in constructing a controller for rapid and automatic charging of a battery. This bridge is used in FIG. 10.

FIG. 10 is a schematic representation of a charging controller for rapidly and automatically charging a storage battery. The controller is associated with a battery and a transducer mounted in the No. 2 cell, and also with a transconductance $G_M$.

This is constructed to produce the required large charging current $i_C$ upon command of a small potential from the controller, and also constructed so that the magnitude of the charging current is governed by the magnitude of the potential $v_F$ at the output of the controller.

4. DESCRIPTION OF THE PREFERRED EMBODIMENTS

The structure of the transducer, and its application to measurement and control, is treated generally, specifically, and theoretically. Quantative examples are given so that a person skilled in the art will know how to make and use the transducer of this invention.

4.1 REFERENCES

The following references have been consulted for information and definitions:

A. A. E. Knowlton, 7 th edition of the STANDARD HANDBOOK FOR ELECTRICAL ENGINEERS — McGraw-Hill, Inc. Dr. J. Lester Woodbridge has prepared section 21 — BATTERIES- which begins on page 1968. This is an especially useful source for electric cellls in general, and lead-acid cells in particular.

B. HANDBOOK OF CHEMISTRY AND PHYSICS — (C & P) — 44 th edition, Chemical Rubber Publishing Co., Inc. Diffusion is defined on page 3218 and evaluated on page 2274. The conductivity of sulphuric acid as a function of concentration and temperature is given on page 269 and page 2691. Specific gravity is related to concentration on pages 1996 and 2092.

C. Professor Henry Smith Carhart provides several references in his discussion of the concentration cell on page 215 and FIG. 16 of Volume XX of the 1911 edition of the NEW INTERNATIONAL ENCYCLOPAEDIA, edited by Daniel C. Giltman, Harry T. Peck, and Frank M. Colby, and published by Dodd, Mead, & Co., New York.

D. Del Toro & Parker — PRINCIPLES OF CONTROL SYSTEMS ENGINEERING — McGraw-Hill Book Co., Inc., 1960. This general reference defines transducers and shows their use for measurement, and especially for control, on page 230. Amplifiers are considered on page 544.

E. T. M. Frederiksen, W. M. Howard, & R. S. Sleeth — THE LM-3900 — A NEW CURRENT DIFFERENCING QUAD OF ± INPUT AMPLIFIERS — National Semiconductor Corp., 2900 Semiconductor Drive, Santa Clara, CA, 95051. This 39 page paper, when taken in conjunction with the companion specification for the LM-3900, is a comprehensive treatment of the structure and application of a Norton amplifier integrated circuit. This tiny device contains four amplification sectors, each of which has good performance when operated on a single power supply of 4 to 36 volts; yet costs only about $1, in unit quantity.

F. WEBSTER'S THIRD INTERNATIONAL DICTIONARY — unabridged.

A transducer is defined as a device actuated by power from one system and supplying power in the same or any other form to a second system (as a telephone receiver, or quartz crystals that produce electric power from mechanical power).

4.2 BASIC STRUCTURE, METHOD, AND MATERIALS

Figure 1:
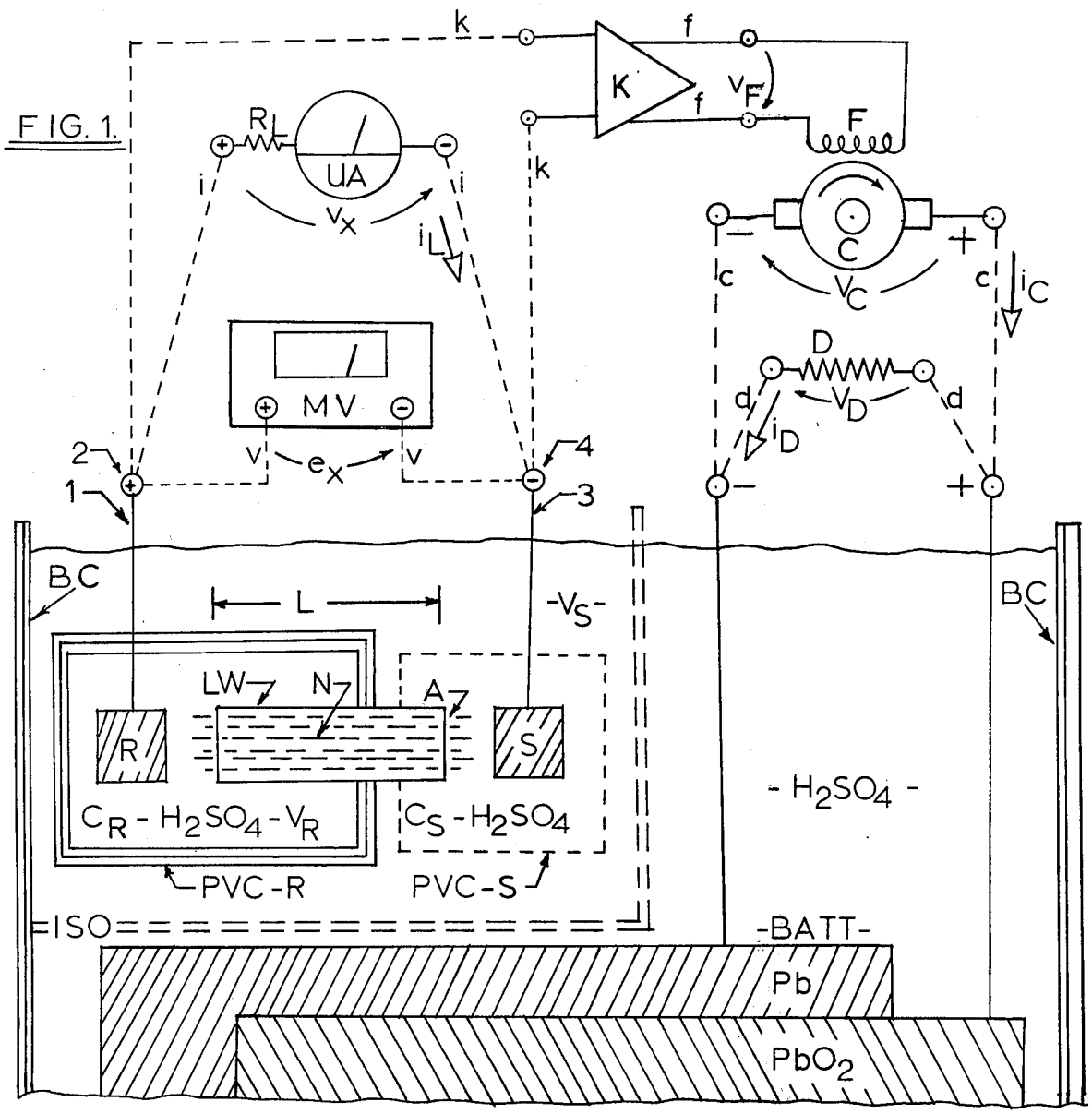

This section makes reference to FIG. 1 and FIG. 2 to describe a basic transducer and four applications. A general method is outlined, and materials and processes effecting the transfer function shown in FIG. 2 are considered in some detail.

It will be observed that the illustration shown in FIG. 1 is an entirely schematic representation of a particular type of transducer of the invention, and that it is associated with a cell of a storage battery, and also with other apparatus which may be used with these in normal service, or for calibration. The sensor electrode S will normally be above the plates. The plates will generally be connected with others in the cell in a manner like that shown by Knowlton, Ref. A., FIG. 16.

A Transducer FIG. 1

The TRANSDUCER shown schematically on the left hand side of FIG. 1 is similar to the one first described in the summary of section 2.

The REFERENCE includes a container PVC-R holding a sample of stable reference sulphuric acid electrolytes $H_2SO_4$, having volume $V_R$ and concentration $C_R$, and making contact with a surface area of sponge lead reference electrode R, which is coupled by an insulated wire 1 to an external reference terminal 2.

The LIQUID WIRE, LW, is contained in an insulated tube having end to end length L, and geometric cross-section area A, and also filled with long straight nylon fibers N which extend out from the ends of the tube. A joining electrolyte, which provides a path for a small electric measuring current $i_L$, is contained in the capillary voids between these fibers, and electrically connects the reference electrolyte and the sensed electrolyte, while generally preventing mixing of these electrolytes.

The SENSOR includes a sensed electrolyte container BC holding a sensed sulphuric acid electrolyte $H_2SO_4$ having a volume $V_S$ and a concentration $C_S$, and also making contact with a surface area of sponge lead sensor electrode S, which is coupled by insulated wire 3 to sensor terminal 4. When the insulating partition ISO is in place, as shown in FIG. 1, the volume of the sensed electrolyte is restricted to that around the sensor electrode, so that the transducer can be calibrated, or operated as a concentration gage without being influenced by the electric cell, and in this case the sensed container may be called PVC-S. On the other hand, when the isolating partition ISO is removed, the sensed electrolyte becomes the electrolyte of the electric cell shown to the bottom and right of FIG. 1. The transducer then senses the state of charge of the cell. In this case, it is preferred to shield the sensor electrode with protector PVC-S, which is typically a plastic tube with ventilation holes to admit the sensed electrolyte.

The Storage Cell And Other Apparatus In FIG. 1

A lead-acid storage cell is shown schematically on the bottom and on the right hand side of FIG. 1, as being in case BC, and having a lead peroxide positive plate $PbO_2$ connected to battery positive terminal +, and also having a finely divided or sponge lead negative plate Pb connected to battery negative terminal —. To calibrate a battery gage, or a battery charger, or in general service, these terminals may be connected by jumper wires $dd$ to the terminals of an energy dissipating load D, which will operate at a terminal voltage $V_D$ and carry a current $i_D$. Or alternatively, the battery terminals + & — may be connected by jumper wires $cc$ to a charging device C, so that electrical energy is supplied to the plates to restore the chemical energy of the cell at a voltage $V_C$ and with a current $i_C$. This is governed by the charging control input F, which is connected through wires $ff$ to the controller K. The feedback loop of this charging system is closed when jumper wires $kk$ are connected to terminals 2 & 4, so that the controller is governed by the transducer.

The transducer will be calibrated, or used as a battery gage, when coupled to the electric indicating meters appearing on the left of FIG. 1. Direct current millivoltmeter MV has a very large input resistance, so it draws a negligable indicating current. It measures the electrochemical potential $e_x$ of the transducer when jumper wires $vv$ are connected to terminals 2 & 4. On the other hand, the resistance $R_{LW}$ of the liquid wire, which is usually the same as the transducer's terminal resistance, will be important when the microammeter UA, having terminal resistance $R_L$, is connected using jumper wires $ii$. The significant measuring current $i_L$ drawn by the microammeter will reduce the transducer's terminal voltage $v_x$ to a potential appreciably less than $e_x$. The resistance of the liquid wire is ordinarily calculated from the measured values of $e_x$, $v_x$, and $i_L$ or $R_L$.

Transfer Function Of The Transducer

FIG. 2 is a graphical representation of measurements made on a transducer constructed as described above, and with the isolating partition ISO in place to separate the sensor from the electric cell. They may be considered as the measurements for calibrating a concentration gage.

The reference container was filled with reference elecrolyte having a concentration $C_R = 250$ grams per liter, which is representative of the strength of a discharged lead-acid cell electrolyte. Electrolytes of known concentration $C_S$ were placed in the sensed container PVC-S in sequential calibration steps, and the electro-chemical potential $e_x$ corresponding to a specific concentration $C_S$ was noted and graphed. The potential was measured with only the millivoltmeter MV connected to the transducer by jumper wires $vv$ as shown in FIG. 1, so the resistance of the liquid wire does not enter into this data. The reference terminal 2 is found always to be positive with respect to the sensor terminal 4 when the sensed concentration exceeds the reference concentration.

The potential $e_x$ in FIG. 2 is zero, so the transducer has a negligable zero offset as would be expected, when the sensed concentration is the same as the reference. The slope of the transfer function is called the transfer gain: $(d\ e_x / d\ C_S) = 19$ mv /100 g/1, typically, for sponge lead in $H_2SO_4$.

The measured transfer gain has been found to almost always be in the 17 to 20 mv/100 g/1 range. Materials from different manufacturers, and different electrode construction processes, appear to make the difference. The transfer function is generally found to be linear within ± 1.5% over a 40 mv span, which is typical of the difference between charged and discharged cells.

The potential $e_x$ is practically independent of temperature. The zero drift is so small that a definite polarty and magnitude have not been established. The transfer gain has a small, and apparently linear, decrease with increasing temperature; the coefficient being typically $-0.1\%/C°$, but sometimes less. Most of this should be compensatable with a small element.

I have referred to the sensed and reference electrolytes as though only the sensed electrolyte was varried in use. However, it will be apparent that this need not be the case. The sensor is basically an electric comparing or differencing device, ie, $e_x$ is proportional to $C_S - C_R$. Both concentrations can be variables, so this transducer could be used as the sensor in a conrol system wherein both concentrations varry, but the system maintains a constant difference. In this case, the transfer gain will be close to: $[d\ e_x/d(C_S - C_R)] = 19$ mv/100 g/l, over a fair range.

The gain may change somewhat because of a small non-linearity, but this is not expected to be a practical problem.

Materials, Processes, and General Methods

Specific factors which effect the transfer gain or zero offset of the transfer function are discussed with a view to making some useful generalizations on method.

Electrodes

Lead peroxide $PbO_2$ electrodes in sulphuric acid electrolyte appear to have about the same transfer gain as sponge lead Pb electrodes, but perhaps somewhat less short term stability. However, the long term stability, especially in the presence of pollutants associated with a much used lead-acid storage cell, may be even greater than that of sponge lead. The production proceedures used on each will have a noticable, but generally second order, effect. Lead peroxide may turn out to be the preferred material, because it now appears to be basically more resistant to sulphation. Cadmium is also expected to be a suitable electrode material in view of the comments of Knowlton, Ref. A., paragraph 86, wherein he describes the use of cadmium to estimate the condition of the plates in a cell.

It is, of course, important to insulate the joint between the electrode and the wire or other coupling to the terminal of the electrode whenever dissimilar metals are used. It is also considered advisable to insulate the majority of the exposed surfaces of the lead-antimony grid often found to support the sponge lead material. Then the electrolyte will contact a surface area of practically pure material. And this area should be much larger then the geometric area of the electrode. Best long term results have thus far resulted from the use of a finely divided or sponge electrode material, as opposed to a flat surface. This may be because electrolyte can penetrate to the inner surfaces and there make good contact, whereas gas and pollutants do not penetrate to nearly the same extent.

The electro-chemical potential $e_x$ appears to be the algebraic sum of two surface contact potentials — one generated at the surface area of an electrode where it contacts an electrolyte, and the other at the second surface area where it contacts the second surface electrolyte. There may also be a small contact potential where the two electrolytes meet, but I have not seen this yet. What matters is the electrolyte concentration right at the contact with a surface area, and the composition of that material.

This theory is supported by the observation that the time required for $e_x$ to substantially respond to a step function change in the concentration of one of the electrolytes — ordinarily a minute or so in the case of sponge lead — is notably increased if the electrode is somewhat isolated from the changed electrolyte by a heavy coat of nylon N so that more time is required for the force of diffusion to carry the stronger acid to the surface. And the time is decreased if the electrode has a generally flat surface and is directly exposed to the changed electrolyte.

The previously noted advantage of a porous electrode material in the presence of gas is apparent when it is remembered that a hydrogen electrode is classically made by allowing hydrogen gas to accumulate in the platinum black on a platinum electrode. But the gas in an electric cell does not appear to pass through a porous film of long strand nylon N wrapped thinly around an electrode. This added protection is preferred, and is generally supplemented with a protective outer covering of thin plastic which is ventilated with a number of small hoses, which also appear to keep out gas. The result seems to be reduced exposure of the electrode to both gas and lead sulphate crystals occurring in a much used cell. The electrode is more stable, i.e., has less zero drift, and has a longer useful life under the severe abuse of an accelerated life test.

However, electrode protection has the effect of slowing the response to a changed concentration. The time constant of a well protected electrode may be 7 to 10 minutes. This appears to be acceptable in most present applications.

Electrode material and electrolyte composition determine the transfer function- both magnitude and polarity. While lead-antimony in sulphuric acid has a transfer function similar to that shown in FIG. 2, carbon[c] electrodes in salt water are quite different, as are copper electrodes in copper sulphate. The useful life is obviously dependent on the electrode material being inert in the electrolyte, and having a surface unaffected by gas or pollutants found in the electrolyte. The life is also determined by the tendency of the electrode to accept surface deposits or plating from the electrolyte. The life of copper electrodes in copper sulphate is limited by this effect.

Note c: Since carbon is operable as an electrode, and since the conductivity of carbon increases with temperature, and therein has a resemblance to semiconductor materials such as germanium and silicon, with added impurities similar to those used in making transistors, it is expected that a variety of semiconductors will also operate as electrodes in this transducer.

Method

The general method for making an electrode is to select a material which can be constructed to have a porous surface, is inert in the electrolyte to be sensed, and retains its surface integrity in the presence of components and gases in the electrolyte, form it into a small electrode with a surface area available to contact electrolyte, connect and insulate a wire or other means coupling to a terminal, insulate the connection and preferably all extraneous surfaces, and then preferably further protect the electrode from gas and contaminants with a capillary film, and ventilated outer protective covering.

Electrolyte

It is understood that the sulphuric acid electrolyte ordinarily used to initially fill dry charged lead-acid storage batteries has only one important constituent disolved in distilled water-$H_2SO_4$. This is further believed to come with a concentration of sulphuric acid close to 450 grams per liter solution. I have used this reagent in various concentrations to construct transducers. The 450 g/1 liter concentration corresponds closely to 1.265 specific gravity at normal temperature, and is the strength usually found in an electric storage cell at full charge, or approaching it.

However, there may be trace impurities, including those noted by Knowlton, Ref. A., paragraph 51. While there is good reason to expect that some impurities which may enter fresh electrolyte will alter the transfer function, I have not yet seen this. Nor have I observed a change in the transfer function when lead sulphate $PbSO_4$ salt was disolved in the electrolyte by the discharge of a battery.

By far the most damaging effects from an electrolyte on an electrode result from allowing the wet surface of an electrode to dry in air. This ordinarily renders the electrode useless by discharging it, but it can occasionally be restored to service for a time by recharging with an electric current.

Used electrolyte generally contains gas, lead sulphate crystals, and other pollutants which were discussed under the heading "Electrodes."

A reference electrolyte may be altered in a way which causes a zero offset in the transfer function if it is used to activate a dry charged sponge lead electrode. With any electrode material used thus far, it is preferred to activate the reference electrode before inserting it in the reference container, i.e., preactivate by immersing it in the strongest electrolyte to be sensed for a time which may extend beyond 2 hours. This appears to release a gas and complete reactions which change the nearby electrolyte composition. When a preactivated and still wet reference electrode is sealed in a reference container it will not quickly dry, and will generally not alter the electrolyte thereafter inserted.

Local action tends to change the structure of the reference electrode, and so is to be avoided. This is minimized by using the least practical strength of reference electrolyte, so it is preferred to use a reference electrolyte having a concentration equal to the minimum concentration to be sensed.

Method

The general method preferred is to use a fresh and good quality reference electrolyte of minimum practical concentration, and to preactivate the reference electrode with a relatively strong electrolyte which is then discarded, and to remove all gas from the container. When feasible, it is preferred to filter the sensed electrolyte to remove gas and sulphates before it contacts the sensor, but this may require a forced circulation apparatus.

Liquid Wire, or Joining Container

The transfer function of the transducer shown in FIG. 2 is not known to be changed significantly by the form of the liquid wire which contains the joining electrolyte. A long thin capillary tube appears to operate about the same as a porous partition made of good heavy drafting paper. No change is observed when nylon N is added to a larger tube. The transducer will operate when there is an electrolytic path through the joining electrolyte for a small measuring current, $i_L$ in FIG. 1, to flow between the reference and sensed electrolytes.

However, the form of the liquid wire has a great effect on the long term stability of the transfer function — especially the zero offset; and also on the electrical resistance appearing between the terminals of the transducer.

The zero of the transfer function will shift in direct proportion to a change in the concentration of the reference electrolyte. This can come about as a result of fluid flow, or transport of a mass of a constituent of the electrolyte under the force of diffusion. Sulphuric acid diffusion is considered in more detail in section 4.3 & 4.4. In general, it is reduced by a long liquid wire or joining container with a small effective cross-section area. It is also said to be less at low temperature. With the possible exception of temperature, the factors which reduce diffusion also reduce fluid flow. Then what is required for a stable transfer function is to generally prevent mixing of the sensed and reference electrolytes. This keeps the concentration of the reference electrolyte stable, and also avoids altering the concentration of the sensed electrolyte if its volume is small.

In theory, a very small pin hole through a partition common to the reference and sensed containers will make the simplest and most economical "liquid wire", or "porous partition". This design is approached in the Method Outline of section 2.2, but the nylon fibers N were preferably added to protect against possible later blockage of the hole by a gas bubble, crystal of sulphate, or dirt. And adding the nylon necessitated making the hole somewhat larger than a pin prick. It is found that the long straight nylon fibers shield the hole against gas and dirt. When gas can be a real problem, it is preferred to run the nylon fibers continuously from electrode to electrode, as shown in section 4.4. A pinhole with porous facing protectors, or a simple porous partition with small cross-section area, may well be the most economical design of the future, but it will be awkward to calculate its diffusion. A long thin glass capillary tube is a classic form of liquid wire, but it should be protected from gas, especially at the ends. Of course, all materials should be inert in the sensed electrolyte, and unaffected by associated gas or contaminants.

Fluid flow and other effects are reduced by positioning the reference electrolyte preferably at the same elevation as the sensed electrolyte. Pressure equalization by use of a flexible reference container wall will also assist in stabilizing the concentration of the reference electrolyte.

The electrical resistance between the terminals 2 & 4 of the transducer shown in FIG. 1 is generally the same as the end to end resistance of the liquid wire or joining container. This is because the liquid wire is ordinarily constructed to have a small effective cross-section area containing the joining electrolyte, and may also have a fair length, whereas the reference and sensed containers ordinarily have a considerable area, and contact a relatively large surface area on the electrodes. So the resistance of the transducer is herein referred to as the resistance of the liquid wire $R_{LW}$. However, if differing structures are used, this may not be applicable. I have constructed an accelerated age test device in which the sensed and reference electrolyte areas are comperable to an extrordinarily large liquid wire effective area, and have found the resistance to be distributed.

Resistance is treated quantitatively, along with diffusion, in section 4.3 and 4.4. Generally, a structure which decreases diffusion and fluid flow also increases resistance, so resistance is occasionally used to estimate diffusion.

Resistance, of itself, is of little consequence when a high resistance indicator, such as the millivoltmeter MV in FIG. 1, is used to measure potential $e_x$, as in a concentration gage. However, it is the basis for temperature compensation for thermally dependent characteristics of a lead-acid cell — both on charge and on discharge. And it can be useful as an indicator of the temperature of the sensed electrolyte in a reagent concentration gage.

Figure 5:
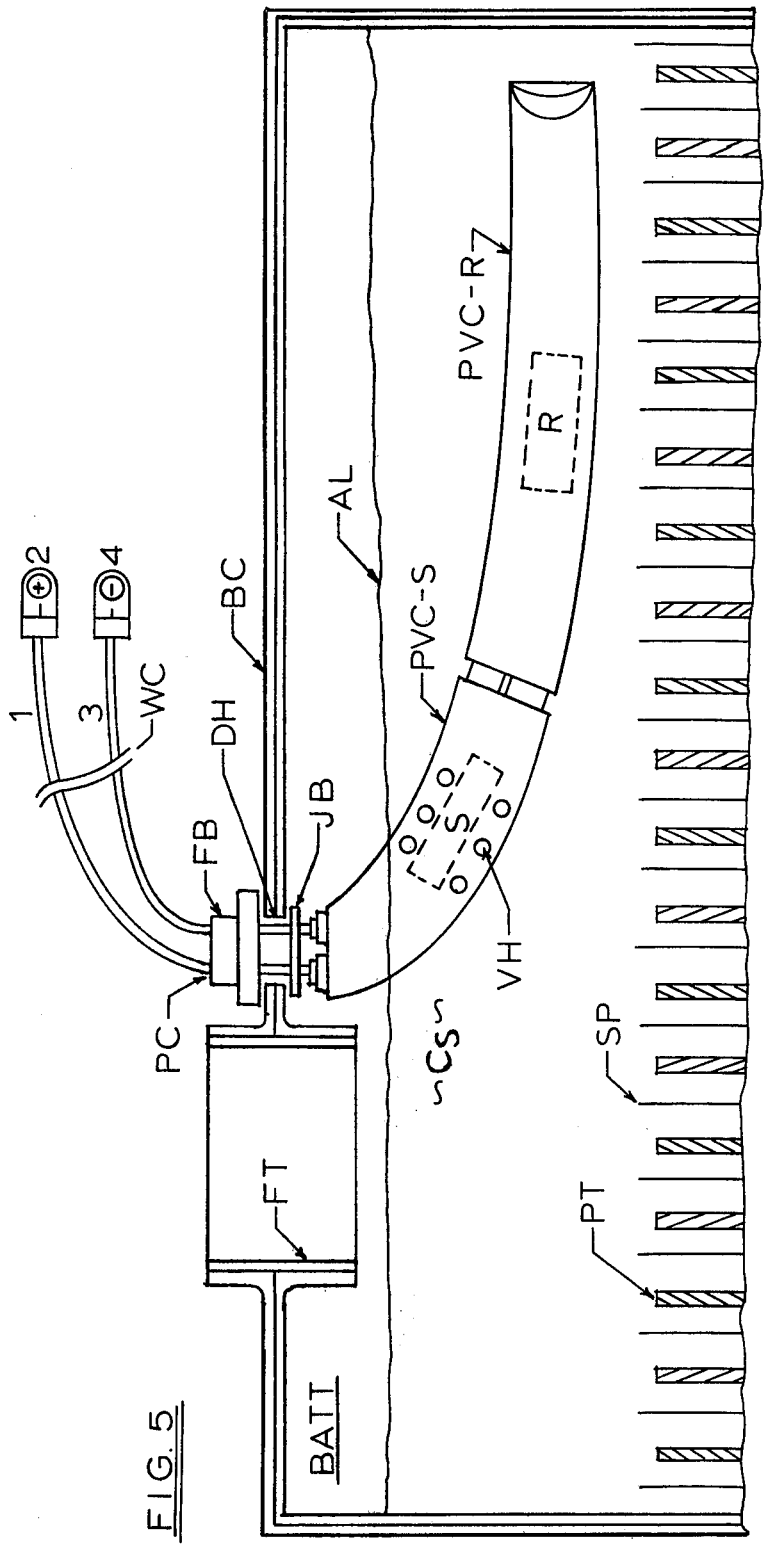
FIG. 5 is a schematic representation of the second preferred transducer of FIG. 4 shown mounted in an electric cell of an installed storage battery.

To stabilize resistance, and thereby get full benefit of the substantial thermal dependence of the joining electrolyte, which has a non-linear form most appropriate for lead-acid cells, the joining container or liquid wire is preferably constructed to by physically stable with time and over the temperature range of interest, and also in the presence of the electrolytes, gas, etc., to which it is to be exposed. This includes both the outer tube, or the joining common partition hole, and the filling porous or capillary material, if used. It is also preferably close coupled to the sensed electrolyte. This may be done by immersing the liquid wire, or all of the transducer, in the sensed electrolyte as shown in FIG. 5. This will keep the temperature of the joining electrolyte close to that of the sensed electrolyte. When the effective length H and cross-section area $A_e$ of the joining container, i. e., the porous or capillary voids in which the joining electrolyte is contained, are constant with time and temperature, the end to end electrical resistance $R_{LW}$ will be proportional to the electrical resistivity of the joining electrolyte. Since its temperature is practically that of the sensed electrolyte, the resistance $R_{LW}$ will be a measure of the temperature of the sensed electrolyte.

Method

The general method for constructing and positioning the joining container to hold the joining electrolyte is to form connected voids between the reference and sensed containers which are filled with a joining electrolyte, so that the reference and sensed electrolytes are electrically connected, and an electrolytic path is established for a small measuring current to flow between the reference and sensed electrolytes; and to construct the joining container so as to generally prevent mixing of the sensed and reference electrolytes, so that the reference and sensed concentrations are not altered by fluid flow or transport of a mass of a constituent of the electrolytes; and preferably to construct the joining container so as to prevent gas and contaminants from later reducing the flow of a measuring current; and also preferably to make the joining container structurally stable with time and temperature, so that the end to end electrical resistance of the joining electrolyte will be proportional to the electrical resistivity of the joining electrolyte, so that the electrical resistance will be a measure of the temperature of the sensed electrolyte.

Measurement and Control Applications

A transducer has been described in conjunction with FIG. 1, and its transfer characteristic shown in FIG. 2. The following sections illustrate four uses of this article of manufacture, to measure and to control electrolyte concentration, and battery charge and energy.

A Concentration Gage FIG. 1 & FIG. 2

A concentration gage is constructed by connecting jumper wires $vv$ to the input terminals of millivoltmeter MV, and by isolating the sensor electrode S in a small container of sensed electrolyte PVC-S, formed by inserting isolating partition ISO.

The gage is calibrated by placing an electrolyte of known concentration $C_S$ in the container of second electrolyte, and noting the corresponding potential $e_x$ across the millivoltmeter. This step is repeated a number of times with other electrolytes of known, but different, concentration until the range of interest has been covered. Thereafter, the concentration of an unknown electrolyte can be measured by placing it in this same container and reading the potential. It will be more convenient to use this gage if the container of the sensed electrolyte is constructed to be the large barrel or bolb of a syringe.

FIG. 2 is a graphic representation of a calibration of a similar concentration gage.

A Battery Gage FIG. 1 & FIG. 3

A battery gage is constructed in the same way as the preceeding concentration gage, except that the isolating partition ISO is removed, so that the sensed electrolyte is the active electrolyte of the cell. This arrangement was used to make the calibration measurements shown graphically in FIG. 3. The battery gage is calibrated by noting the potential $e_x$ indicated by the millivoltmeter MV when the battery is fully charged, and again at each of a number of partial discharge steps.

The battery can be charged by connecting the jumper wires cc as shown in FIG. 1, so that the charging current $i_c$ will flow into the cell from the charging device C, which is suitably governed by the controller K through controlling input F. Jumper wires kk are omitted, and the controller is driven from an external source, so as to produce a suitable charging current for an extended time. The battery can be said to be charged when the concentration $C_S$ of the electrolyte of the cell has reached 450 grams per liter, and the reading of the potential $e_x$ is stable with time. The final value of $e_x$ is noted as one of the calibration points.

Discharge of the cell in known increments is accomplished by replacing the charging device C with the energy dissipating device D, connected through jumper wires dd. An increment of discharge is the product of the discharge current $i_D$ and the time during which the current flowed. The measure of the potential $e_x$, as shown on the millivoltmeter MV, corresponding to each known increment of discharge, is noted until the battery is practically drained of charge. If the potential $e_x$ has a noticable extraneous change corresponding to the beginning or end of discharge current, it is best to read the millivoltmeter with the discharge current temporarily turned off. This tendency of $e_x$ to an extraneous indication is reduced and practically eliminated by proper adjustment of the position of the sensor electrode S with respect to the battery plates, in a manner which will be discussed. The battery may be said to be practically drained of charge when its terminal voltage $V_D$ begins to fall rapidly under steady discharge. This is usually close to the time at which the voltage has fallen to ¾ its normal value.

A calibration similar to that shown in FIG. 3 is used as the basis for labeling the indicator, MV in FIG. 1, with symbols analogous to a gas-gage in a car: F, ¾, ½, ¼, E. Then, when the battery is in normal service, the indicator will show the state of charge of the battery, and the operator will know what work can be done before a recharge is necessary. And he will also be able to tell when the battery is fully charged.

The indicator MV in FIG. 1 can be replaced by any of a great variety of instruments suited to the requirements of the application. It may be analog, digital, or symbolic, i.e., a moving pointer, flashing digits or letters, colored lights, or even an audio tone or recorded statement. On the other hand, if the battery is used in a remote instrumentation platform, the electrical output $e_x$, or $i_L$, of the transducer may be conditioned for telemetering to a central station, for computer analysis and display when appropriate. It will be recognized that the term "indicator" is general, covering any apparatus which is capable of converting the transducer's voltage, or current, or resistance output into a useful signal, at a location where it may be conveniently interpreted as battery state, concentration, temperature, age, etc.

A Temperature Compensated Battery Gage FIG. 1.

The battery gage senses and indicates the concentration of the active electrolyte of the cell. This is converted, by calibration, to a battery state indication which is valid at the temperature at which the calibration was made. However, if temperature compensation is not provided, the indication of battery state is ordinarily wrong at a much different temperature. Recalibration will show a considerable change in battery state, especially if it is below freezing temperature. Knowlton, Ref. A., FIG. 19, shows the available charge changing from 60% to 115% of its normal 100% capacity at 80° F., as the internal cell temperature ranges between 20° F. and 120° F. Yet the concentration of the electrolyte of the cell is not appreciably changed, and the electro-chemical potential $e_x$ of the transducer is essentially constant.

In addition, the terminal voltage $V_D$ of a cell delivering a substantial discharge current $i_D$ is a function of the internal resistance of the cell; and more often than not, this is largely due to the electrolyte resistance, which is dependent in a similar manner. Electrolyte resistance increases rapidly as the battery gets colder. These things are shown in C & P, Ref. B., page 2691, and also in Knowlton, Ref. A., paragraph 73, which adds that the internal resistance is also a function of charge state.

Then a battery gage for a battery used in an outdoor environment should be compensated to indicate the charge available at the temperature of the cell; or better, the energy available at the present cell temperature. Since delivered energy is delivered charge (ampere-hours) multiplied by the terminal voltage at which the charge was delivered, more compensation will be required for an energy state gage than for a charge state gage. It will be apparent that the delivered energy can be measured for calibration purposes with the apparatus shown in FIG. 1, by noting the terminal voltage $V_D$ at which the load current $i_D$ was delivered to energy dissipator D through jumper wires dd over an incremental time interval, and summing all increments of energy until a state of discharge has been reached.

Temperature compensation is provided in FIG. 1 when the meter MV is replaced by indicating microammeter UA connected to terminals 2 & 4 of the transducer by jumper wires ii, so that a small measuring current $i_L$ flows through the resistance $R_L$ of the meter UA. The temperature compensating element is the resistance $R_{LW}$ of the liquid wire. This resistance is ordinarily constructed to have a value 1 to 4 times the resistance $R_L$ of the indicator, when the cell is at room temperature.

When the liquid wire is thermally coupled to the cell electrolyte, it operates as a temperature compensating element in a properly designed transducer matched to a suitable indicator; because the electrical conductivity of the joining electrolyte — which determines the resistance of the liquid wire — is temperature dependent in generally the same manner as the charge or energy storage capacity of the cell. This can be seen by comparing Knowlton, Ref. A., FIG. 19, and paragraphs 67 & 73, with C & P, Ref. B., page 2691. Charge capacity and internal resistance are both non-linear functions of cell temperature, with the function increasing at lower temperatures. This is also true of the conductivity of the sulphuric acid electrolyte, which is the medium through which the measuring current must flow in the liquid wire, but more so.

For example, the conductivity of a given concentration is 0.89 mho/cm. at 30° C., but only 0.52 mho/cm. at 0° C. The conductivity of the joining electrolyte in the liquid wire has the same general non-linear dependence on temperature as the characteristics of the cell, but the coefficients are generally greater when viewed on a percentage basis. It is for this reason that the resistance of the liquid wire $R_{LW}$ may be partly swamped by indicator resistance $R_L$. While optimum values need to be determined by calibration of each type of battery and transducer, good charge compensation will ordinarily be obtained when $R_{LW}$ is 1 to 2 times $R_L$. And good energy compensation is expected when $R_{LW}$ is 2 to 4 times $R_L$.

Figure 6:
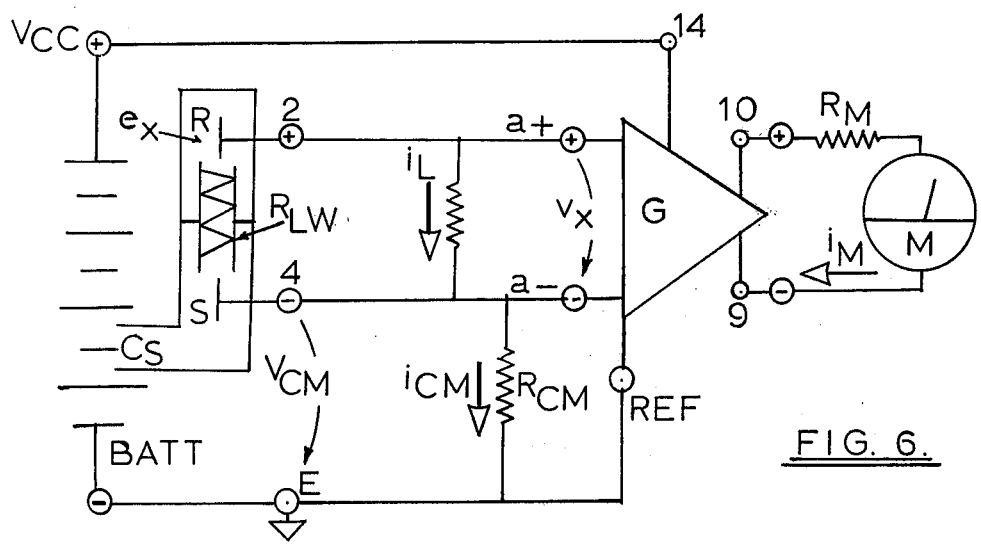
FIG. 6 is a schematic representation of a transducer mounted in a battery and connected to matching amplification and indicating means, so as to operate as a battery gage.
Figure 7:
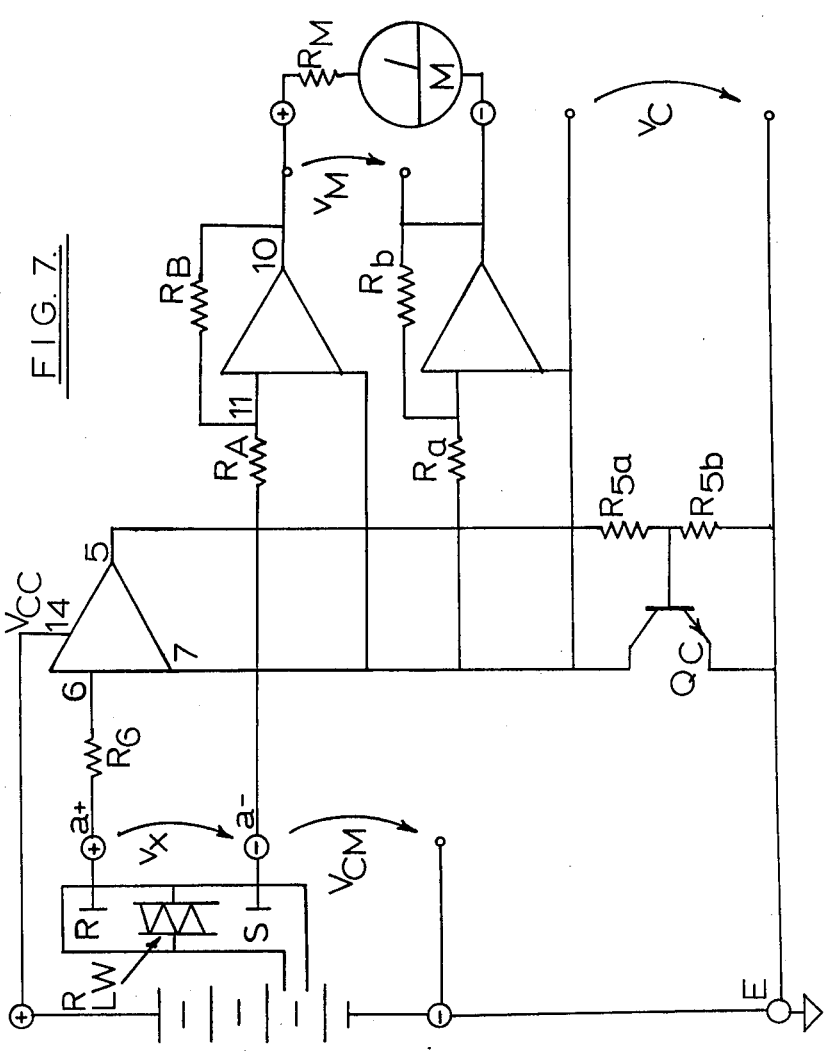
FIG. 7 is a more detailed representation of the arrangement shown in FIG. 6, including an improved way for using an integrated circuit amplifier group.

It will be apparent that the microammeter shown in FIG. 1 as having resistance $R_L$ is a schematic representation of a general concept, ie, any apparatus responsive to a few microamperes at a few millivolts may be used to replace UA and possibly $R_L$. One such device is shown in FIG. 6 and FIG. 7. Since the integrated circuit amplifier draws a negligible input current at the $a+$ terminal, the resistor $R_L$ can be connected across the transducer terminals as shown in FIG. 6 to get the required loading on the liquid wire resistance $R_{LW}$. The gain of the amplifier may then be increased by reducing $R_A$ to match the compensated transducer to the indicator. The details of the design procedure will be familiar to those skilled in the art. A conclusion, based on the use of the Second Transducer shown in FIG. 4 & FIG. 5 with one particular type of battery is: $R_L = 5000$ for $R_{LW} = 10,000$ ohms, and $R_A = 15,000$ for $R_B = 100,000$ ohms, and a 200 ua meter M for indicating battery state as shown in FIGS. 6 & 7.

There is a substantial advantage in using the liquid wire as a temperature compensating element, because the temperature of the joining electrolyte will be very close to the internal temperature of the cell in which it is ordinarily mounted. The preferred embodiment places the transducer, or at least the liquid wire part, inside the cell as shown for the Second Transducer in FIG. 5.

This arrangement is considerably different from the more conventional temperature compensating means, which include thermally sensitive resistors placed adjacent to the transducer — not inside the cell. These will generally be much less effective than the liquid wire in providing good temperature compensation because the temperature inside the battery is more often than not, quite different from that outside the battery. This is due to its large thermal capacity surrounded by a good thermal insulator in the form of the case, and to the heat generated inside the battery during discharge, and most especially, during charge.

A Charging Current Regulator FIG. 1

It will be remembered that an effective battery charger is one which first produces a large charging current to quickly restore the spent chemical energy of the cells, and then gradually reduces this current to zero, following a program which provides for automatic and expeditious charging, but avoids overheating and overcharging; and that this is best accomplished using a closed loop charging current control system.

Most battery charging systems in current use determine the charge state of the battery by sensing its terminal voltage, and some, usually nearby, temperature. This is compared with a thermally sensitive voltage reference, to produce a charging current which follows what amounts to a preset charging program. As charge progresses, the battery voltage tends to increase, so the feedback system reduces the current. However, there are two notable weaknesses in this method. Terminal voltage is, at best, an "iffy" indicator of battery state, and the temperature used to compensate the voltage reference is more often than not, quite different than the internal temperature of the battery.

The present improved method uses this transducer to more accurately sense the state of charge and the internal temperature of the battery. More effective charging results when a closed loop system is governed by this transducer.

"To determine when a cell has reached a fully charged condition is not a simple problem." This appraisal by J. Lester Woodbridge — Knowlton, Ref. A., paragraph 72 — is supported by data in FIGS. 24 and 23, showing a final charging voltage change of 12% due to changing battery temperature, but only 20% change in charge voltage, when taken from full discharge to full charge at a constant temperature. The problem of sensing charge state from terminal voltage is further complicated by the fact that voltage rises with charge state, but it falls as temperature increases. And temperature increases most near the end of the charging phase. Furthermore, the final charge voltage usually decreases with increasing age of the battery. Moreover, the condition of the negative active material, as well as impurities in the electrolyte, have a marked effect on the final charge voltage of the cell.

When one considers that most charging regulators are governed by charging voltage, and compensated for a temperature outside the battery, it is little wonder that effective charging is a continuing problem.

The charging apparatus of FIG. 1 largely overcomes these difficulties because it is governed by the concentration of the electrolyte, which is translated by the transducer to a potential which is essentially independent of temperature; yet contains a temperature compensating element — the resistance of the liquid wire — which is responsive to, and a measure of, the internal temperature of the cell.

Transducer terminals 2 & 4 are connected by jumper wires $kk$ to the input of controller K, which governs charging control F. This in turn, governs the charger C, which supplies the charging current $i_C$ through jumper wires $cc$ to the cell at terminal voltage $V_C$, as the charger is driven by a primary power source.

The controller K is constructed to be doubly responsive to the transducer. When the electro-chemical potential is near zero, corresponding to a discharged cell state, the charging current is run up to a value somewhat less than the ampere-hour capacity of the battery. This large current continues until the heat generated in the cell has decreased the resistance $R_{LW}$ of the liquid wire, or until the gas generated by the current stirs up the strong acid produced by the current, so this can increase the potential of the transducer. The controller then reduces the charging current so that the temperature is held under 110° F., and further reduces the current as the cell nears full charge, until it is at or near zero at full charge.

A method and means for constructing a controller and a closed loop charging system are detailed in a following section 4.6.

The calibration procedure is an inverted form of that previously described for calibrating the battery gage during discharge. Herein the values of $e_x$ corresponding to known increments of charge (current $i_C$ multiplied by the time during which it flowed) are noted along with the cell temperature, to define a fast and safe program for the controller K, so that it is matched to the specific type of transducer and battery with which it is to be used.

Experimental evidence indicates that full charge state has been reached when the output of the transducer is between 36 and 40 mv, and shows no further significant change with several added increments of charge. This signifies that essentially all the lead sulphate in reversable form has been converted to lead or lead peroxide, so further charging can add but little chemical energy to the cell.

It has also been found that about 90% of the charge taken out of a battery can be replaced in about 2½ hours, using an automatic battery charger which is governed by this transducer. Means for constructing a suitable controller are shown in following section 4.6.

4.3 A FIRST TRANSDUCER FIG. 1

A transducer is defined by Webster, Ref. F., as a device transferring power from one system to another system in a different form, so it is apparent that the best transducer is one designed to match both systems, and to meet the operational requirements at reasonable cost. The intended application and the two systems are defined before describing the first transducer.

Specification For An Industrial Battery Gage

Many large lead-acid storage batteries are required for heavy industrial use where long reliable service is essential. They are used to power the fork lifts of a major industry, and also the central office of a telephone exchange, so premature failure of a single cell can be costly. Since experience shows that this is a hazard, it is required that the concentration of the electrolyte in each cell be measured periodically to locate weakening cells before they cause an important loss of available energy. In addition, the state of each battery bank is continuously monitored to insure that the service load is not excessive and that the charging apparatus is functioning properly. Temperature compensation is not required because the batteries are indoors.

The simpliest possible indicator has been specified: a tautband moving coil microammeter with ± 2% accuracy, modified for this application. Ten percent overall accuracy is required.

In general service, the indicator will be plugged sequentially into a small transducer connector on each cell, and its concentration noted so that failing cells can be located early. In addition, some of the cells will be monitored continually, so that an unexpectedly large load or charger failure can be detected before the batteries have lost too much of their stored energy.

Materials And Structure of a First Transducer FIG. 1

This transducer is molded in stable and inert plastic, so it is suited for attachment to the inside of the top cover of the battery case BC, somewhat above the spacers SP, and along side the plastic separation between cells, in a space measuring at least 1¼ inches high by 3 inches long by 1½ inches wide. The liquid wire LW tube, molded in the fully enclosed reference container PVC-R, has a length L of 3 inches, to simplify filling with nylon fibers N. The reference electrode R is held by plastic forks inside the reference container, and the sensor electrode S is held by similar forks on the outside of the reference container, just above the level of the tops of the spacers between the cell plates, so that the sensor will be exposed to the active electrolyte of the cell. The liquid wire tube has an end adjacent to the sensor electrode so as to lessen the liklihood of an extraneous output potential $e_x$ due to current flowing in the cell. Forks are used to mount the electrodes so that both surfaces will be exposed to the electrolyte. The sensor S is protected by a semi-cylindrical cover, which also encloses the end of the liquid wire near S. This cover has vent holes VH (see FIG. 4) arranged along the top and sides — not near the battery plates, again so as to minimize extraneous output potential due to battery current. The measuring wires 1 & 3, or their embedded bus bar equivalent for coupling the electrodes to the terminals, are brought out through the top cover to a small push-on type connector attached to the outside surface of the cover. This mounts and protects transducer terminals 2 & 4, and provides convenient means for connecting portable microammeter UA.

The reference electrode R and the sensor electrode S are as nearly alike as practicable. Each uses a two grid sector of negative plate material, which is sponge lead in a grid frame of lead-antimony measuring about 1.25 by 0.2 inch, produced and dry charged in the same manner as the negative plates of a 6 volt- 120 amperehour- 51 plate- 48 month guarantee battery, manufactured by Gould National, and sold by Montgomery Ward. This electrode material is fresh and dry — never exposed to liquid or appreciable moisture in air following dry charging, because drying in air tends to discharge the electrode material.

The electro-chemical transfer gain of the transducer will be close to 19 millivolts per 100 grams per liter concentration difference when this material and process is used. Consistancy is required to hold the transfer gain within ± 2%.

The insulating measuring wires 1 & 3 are soldered to the lead-antimony frames of the electrodes R & S. Good electrical and physical contact is made over a substantial area so that a slight exposure to sulphuric acid will not disrupt the connection. The PVC insulation on these wires is compatable with PVC liquid cement and the plastic material of the battery case BC cover, and inert in the acid.

The liquid cement is used to reinforce the joint between the wire and the electrode, and to insulate the wire-to-electrode solder connection, and to cover the exposed surfaces of the lead-antimony grid without covering much of the sponge lead area, which is the active part of the electrode.

The long straight nylon fiber N is inert in sulphuric acid concentrations up to at least 500 g/l. Not all nylon fiber has this property. Suitable nylon fiber has been obtained from the central portion of a Japanese import "Nylon Utility Cord" which was sold in Sarasota, Florida, and also in Aspen, Colorado at the principal sporting goods store. A nylon fiber bundle is pulled through the tube of the liquid wire LW in sufficient quantity so that it is tightly packed, and rather long ends of nylon are left in place at the ends of the tube. The nylon ends are wrapped loosely and thinly around the reference and sensor electrodes. This step ordinarily prevents any of the gas, frequently associated with lead in acid, from collecting in the liquid wire or on the surface of the electrode. Otherwise, the electrical conductivity of the liquid wire might be cut off by a gas bubble, or the active surface of the sponge lead might be harmed, or even discharged, by long exposure to gas.

The reference container is filled with reference electrolyte having concentration $C_R = 250$ g/l (1.150 specific gravity), because this will cause the zero output potential $e_x$ of the transducer to correspond relatively well to the concentration $C_S$ of the electrolyte in the storage cell when it is essentially discharged.

The concentration of the electrolyte $C_S$ in a cell when it is near full charge will ordinarily be 450 g/l (1.265 sg), so the usual output potential $e_x$ of the transducer at terminals 2 & 4 is 38 millivolts direct current, reference terminal 2 positive.

The reference and sensor electrodes are made as nearly alike as practicable to minimize stray effects, such as a possible offset potential from the lead-antimony grid. However, electrode size as such has no measurable effect on the output potential so long as the material and process used in each is the same.

Design Calculations FIG. 1

The accuracy of the battery gage is influenced by zero drift or offset resulting from a change in the concentration of the reference electrolyte, the accuracy and sensitivity of the indicating microammeter, and the somewhat variable resistance of the liquid wire. The calculations show how these factors are related, and provide the basis for a prediction of overall gage accuracy.

Zero offset error is assigned a limit of 5% per year, after noting that there will be a possible 2% meter error, plus a possible 10% liquid wire resistance change largely nullified by the greater meter resistance, and 2% possible electro-chemical error due to the non-uniformity of transducer material and process, and the effect of unequal filling of the battery cells. Liquid wire calculations can follow from this and a knowledge of the reference.

Zero error will be in direct proportion to a change in reference concentration, so it is required to hold it constant within 5%. Conventional liquid flow and evaporation will not materially effect the reference because of the capillary properties of the liquid wire, the essentially sealed structure of the reference container, and its placement so that the reference electrolyte is ordinarily at the same level as the sensed electrolyte in the cell. This leaves diffusion as the major cause of a change in the concentration of the reference electrolyte.

The 5% concentration accuracy statement requires that the mass of sulphuric acid transported $M_T$ through the capillary material N filling the liquid wire LW in a time T of one year shall not exceed 5% of the mass of acid $M_R$ in the container of the reference electrolyte, which has a volume $V_R$ and is filled with electrolyte of concentration $C_R = 250$ g/l. The volume of reference electrolyte is determined by noting that the overall transducer dimensions, $1\frac{1}{4} \times 3 \times 1\frac{1}{2}$ inches, will allow an enclosed volume of reference electrolyte corresponding to dimensions $1 \times 3 \times 1$ inches, which comes out to $V_R = 49.2$ cubic centimeters. Then the mass of the reference acid is $M_r$ 32 12.3 grams. Since a maximum of 5% of this can be transported, $M_T$ 32 0.615 g, max. per year.

A simplified form of Fick's Law of Diffusion given in C & P, Ref. B., is $$M_T = D (A_e/L) T dC,$$

i.e., $M_T$ grams of acid are transported through a liquid wire tube of effective cross-section area $A_e$ cm$^2$ and length L cm in a time T seconds as a result of a concentration differential $dC = C_S - C_R$ grams/cm$^3$. The coefficient of diffusion may be taken as close to $2 \times 10^{-5}$ cm$^2$/sec.

The length L of the liquid wire is 3 inches, so L = 7.62 cm. In the worst case, the cell will be fully charged over the one year time (T = $3.15 \times 10^7$ sec.), so $dC = 0.450 - 0.250 = 0.2$ g/cm$^3$. Then the maximum effective area allowed for the liquid wire is $$A_e = \frac{L M_T}{D T dC} = \frac{(7.62)(.615)}{(2. \times 10^{-5})(3.15 \times 10^7)(.2)} = .0372 \text{ cm}^2.$$

This cross-section area available to the liquid wire electrolyte filling the capillary voids inbetween the nylon fibers N bundled bundled snugly in the tube of liquid wire is used to figure the cross-section area A of the unfilled tube of the liquid wire. Since experience shows that the area $A_e$ is about 0.25 times A in this type of construction, $$A = A_3/0.25 = 0.149 \text{ cm}^2,$$

so the inside diameter of the tube is 0.435 cm, or 0.171 inch. This dimension is used in molding the transducer housing.

The resistance of the liquid wire, $R_{LW}$ in FIG. 1, will reduce the voltage $v_x$ which is available to the microammeter UA when a measuring current $i_L$ flows in the measuring current path, which includes the meter UA, the transducer measuring wires 1 & 3, and the liquid wire LW. The resistance $R_{LW}$ is computed from the dimensions of the liquid wire and the effective resistivity $p$ of the electrolyte in the liquid wire having effective concentration $C_{LW}$.

This concentration will vary over the length of the liquid wire. After a considerable time under stable conditions, the gradient will approach a linear form, with concentration $C_S = 450$ g/l at the sensor end when the cell is fully charged, and $C_R = 250$ g/l at the reference end. The effective resistivity is not easily calculated because the resistivity of sulphuric acid is a U shaped function of concentration, with a maximum of 1.35 ohm-cm near 360 g/l at 18° C. This is shown in C & P, Ref. B., on page 2690. Study shows that $p = 1.4$ ohm-cm is reasonably close to the real value, and that this will generally stay within the bounds of 1.37 to 1.49 at constant temperature. However, the thermal dependence of $p$ is about $-1.37\%$/F° at 80° F., and this increases at lower temperatures, so $p$ can change significantly if the temperature changes.

When $p = 1.4$ ohm-cm, the resistance of the liquid wire is $$R_{LW} = p\ (L/A_e) = 1.4\ (7.62/0.0372) = 287\ \text{ohms}$$

Experience indicates that this resistance can be reproduced in production transducers with 10% accuracy. This is adequate because the swamping effect of the resistance $R_L$ of the indicator UA will reduce the 10% uncertainty to 2.3% indication certainty.

The Portable Indicator UA, and Accuracy of Measurement.

A reliable taut-band microammeter UA is economically produced by the Simpson Electric Co. of Chicago as the movement in their model 250 VOM. This has a 4 inch scale readable to 1% and responsive to 50 microamperes with about 900 ohms internal resistance $R_L$. When a calibration resistance is added so that $R_{LW} + R_L = 1300$ ohms, and when the electro-chemical transfer function is $$(d\ e_x/d\ C_S) = (19\ \text{mv}/100\ \text{g/l}),$$

fully charged cells will have an open circuit potential of $e_x = 38$ mv, with a corresponding measuring current $i_L = 29.2$ microamperes. This will span 2.3 inches over the face of the meter, and will be readable to within 1.7% of 29.2 ua.

The 29.2 ua span of the meter face is calibrated in percent of full charge, and the zero position is shifted clockwise the equivalent of about 10 ua, so that even severely discharged cells having $C_S$ less than 250 g/l will still read up scale. Thus the indicator shows 0 to 100% of full charge, with 35% overrange on each end.

The anticipated uncertainty of readings on this industrial battery gage comprises 2% for the meter UA, 2.3% for the change in the liquid wire resistance, 5% per year change of $C_R$ by diffusion, and 2% for the variation of the electro-chemical potential $e_x$. In the unlikely worst case, the sum of errors will be 11.6%. However, the diffusion error can largely be cancelled out on a quarterly basis by zero adjustment of the meter. Since it is also quite unlikely that all errors will add simultaneously, the required 10% accuracy can reasonably be expected for the great majority of the readings.

Combined Liquid Wire and Reference Container FIG. 1

I have spoken of the reference container and the liquid wire as separate entities, but this is for convenience. They can, of course, be combined so that the reference electrode is inside the sealed end of the liquid wire, and the electrolyte of the liquid wire is the reference electrolyte.

What counts as the concentration of the reference electrolyte is the concentration of the acid immediately adjacent to, and in contact with the surface of the reference electrode R. So it is desired to know what determines the time of diffusion to carry sensed electrolyte all through the liquid wire LW, to the reference electrode at the far end. Measurements have confirmed that the full statement of Fick's Diffusion Equation must be used, as implied in C & P, Ref. B., on page 2274. However, for perspective, I first make the erroneous assumption that the sensed electrolyte of concentration $C_S$ will diffuse through the capilary nylon N of the liquid wire filled with electrolyte of concentration $C_{LW} = C_R$ as a result of a constant concentration differential $dC = C_S - C_R$, over a length L. If we also think of the diffusion as filling the liquid wire with an added mass of acid $M_A = L\ A_e\ dC/2$ in a diffusion process described by $$M_T = D\ (A_e/L)\ T\ dC$$

which continues until $M_A = M_T$, then the time required will be $$T = L^2/2D$$

Despite the fact that this predicts a time exceeding that measured by a factor greater than ten, it is helpful to show the squared effect of the length L of the liquid wire on the time T for diffusion to become important.

A much more accurate prediction can be made when Fick's differential equation is integrated over both time and length. This shows that an 8 inch liquid wire can be expected to have a time constant in the order of one week.

A Continuous Monitor and Electrode Discharge FIG. 1

If the continuous monitor used in the industrial battery gage draws an appreciable current, it should occasionally be moved to another transducer to avoid discharging a transducer electrode. This can be understood by noting in FIG. 1, that the measuring current $i_L$ for the indicator UA flows out of the sponge lead reference electrode R, and into the sponge lead sensor electrode S. It will be remembered that a discharge current $i_D$ flows into the sponge lead negative plate Pb of the electric cell, whereas a charging current $i_C$ flows out of this same plate. Then $i_L$ is a discharge current for the sensor electrode, and a charging current for the reference electrode. If this measuring current is large and maintained for too long a time, the transducer will cease to function properly because the sensor electrode will be discharged. However, a discharged electrode can frequently be recharged and used for a time thereafter.

A limiting safe charging current has not been accurately predicted. However, it is thought that gas accumulation and electrode deterioration with overcharge are the main problems.

Experimental evidence indicates that one can calculate a safe discharge current. Th sensor and reference electrodes S & R have outside area defined by the dimensions 1.25 × 0.2 inch, but this is generally reduced to an effective area for contact with the electrolyte of $A_E = 0.15$ square inch. A review of a specification for a battery having similar plates indicates that the "charge" is about 0.564 ampere-hours per square inch, so the sensor and reference electrodes will each have a charge of about 85 milliampere-hours, if they are fresh and dry. Then the safe current is 9.66 microamperes for 1 year, if connected 24 hours per day. However, when the cell is fully charged, the indicator will draw 29.2 ua., so a single transducer should be continually used for less than ⅓ year. It is advisable to plug the indicator used as a continuous monitor into another cell on a quarterly basis.

Electrode discharge is generally not a problem because an electronic amplifier will be used, so that the monitor can have an alarm and a remote indicator, and electronic amplifiers generally draw little input current.

There is no evidence, to date, that diffusion is speeded by a measuring current. In fact, there is some evidence to the contrary.

The effect of a discharge current on a sensor electrode can sometimes be countered by a charging current to a terminal of the battery through an electrical resistance. It will be seen in FIG. 6 that a resistor from the sensor terminal 4 to the earth terminal E will carry a charging current to the sensor electrode S.

Alternative Transducer Structures

It will be clear that the processing of material, and the physical structure of a transducer, which may be constructed for carrying out a method of this invention, might take any of a great number of feasable forms. What is shown above and in connection with the following section 4.4 relating to The Second Transducer, is a currently preferred structure, deemed suited for use with a particular type of battery and a particular type of means utilizing the transducer's electrical output, so that a more useful service may be performed at reduced cost.

4.4 A SECOND TRANSDUCER FIG. 4.

Figure 4:
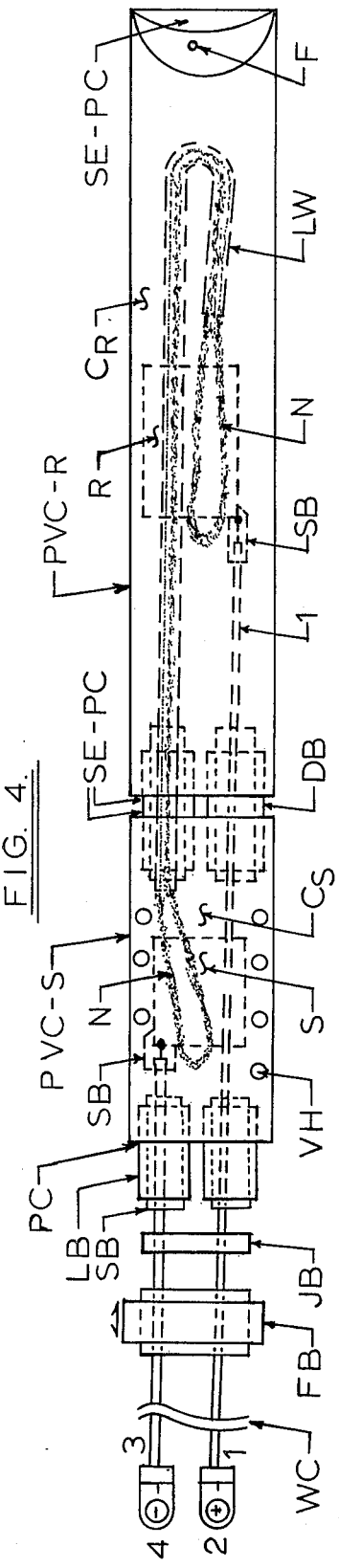
FIG. 4 is a schematic representation of a second preferred transducer suited for mounting in an existing battery.

The second transducer is a complete article of manufacture. It can be used to sense the concentration of most sulphuric acid solutions, whether in an electric cell, or in an industrial process involving acid of variable strength. It is equally useful as a part of a measuring or of a control apparatus, because it has an electric potential output which is a measure of concentration, and a resistance which is a measure of electrolyte temperature. The structure shown in FIG. 4 is especially designed for insertion in a battery cell as shown in FIG. 5. However, it will be equally useful when only the sensitive sector, near the sensor electrode, is immersed in the acid to be sensed, but, of course, thermal coupling will be required if the resistance is to be a measure of temperature.

This second transducer is basically the same as the first transducer described in the preceeding section 4.3 and FIG. 1. However, there are a number of differences in structure made necessary by the requirement for a transducer which can readily be inserted in a cell of a battery already installed for service in an electric vehicle, subject to considerable change in temperature. The container is smaller and more flexible, so that the transducer can be put into a cell through the electrolyte filling tube and mounted as shown in FIG. 5. The liquid wire is also smaller in area to keep the zero drift due to diffusion within the requirement for accurate measurement over a time of 2 or more years. The electro-chemical output potential is the same as that shown in FIG. 2 because the same basic materials are used. But the resistance of the liquid wire through which this potential is measured is closer to 10,000 ohms, so an amplifier will ordinarily be used to match the transducer's output to an indicator in the manner shown in FIG. 6.

The resistance of this transducer has been found to be a useful measure of the temperature of the electrolyte in which it is immersed. It will be a more accurate measure when materials having greater physical and/or chemical stability are used in constructing the liquid wire.

This transducer has been sucessfully used as a portable sensor, inserted in first one and then another battery, or chemical reagent container, as the need arrises.

Transducer Structure FIG. 4

Referring to FIG. 4, it will be noted that the illustration is quite schematic. The plastic tube housing is an assembly of a flexible reference container, PVC-R on the right, and a flexible sensor protector PVC-S, ventilated with holes VH, so as to admit the sensed electrolyte of concentration $C_S$ of the cell to contact with the sensor electrode S, as shown to the left of the figure. The small liquid wire LW is folded inside the reference container, so that the complete assembly forms one continuous tube, with both electrode wires 1 & 3 brought out at the left hand end. Small and large plastic bushings SB & LB, and double bushings DB, provide structural interfaces for cement between the measuring wires and the liquid wire tubing and the outer tubes PVC-R and PVC-S. PVC plastic tube, wire, and liquid cement, are used to construct a flexible and well sealed structure, which is inert in sulphuric acid.

Materials in the Transducer FIG. 4

In FIG. 4 there is a container PVC-R of reference electrolyte of concentration $C_R$, which also houses the reference electrode R connected to its measuring wire 1, and the liquid wire LW. PVC-R is a $5\frac{3}{4}$ inch length of relatively thin wall black PVC plastic tube, cut from stock manufactured-as are all PVC tubes and wires mentioned herein-by the Alpha Wire Corp., and sold by Hammond Electronics of Orlando, Fla. 32802, as PVC-105-4-black, with an inside diameter of 0.208 inch, and 0.028 inch thick walls.

There is also a sensor protector PVC-S which encloses the sensor electrode S attached to its measuring wire 3. PVC-S is a $2\frac{1}{4}$ inch long sector of the same black PVC-105-4 black stock. It is ventillated by 14 holes VH, in an array measuring 1.25 by 0.12 inch on each side, for a total of 28 holes. The array of vent holes is centered in the tube when it is flattened, so that clean holes may be drilled with a No. 44 — 0.086 drill.

PVC clear liquid cement PC for joining all parts and subassemblies, including the double bushings, is sold under the trade name E-Z Weld PVC Clear Cement, and it is manufactured by Paint and Chemicals, Inc., Riviera Beach, Fla. 33404.

Standard PVC cementing technique is adapted to this work on thin wall tubing. Some care is required so that the solvent in the cement does not weaken or disolve the tubing before it is absorbed or evaporates. This is especially true of the liquid wire tube which has an exceptionally thin wall. If the cement penetrates to the nylon bundle N, which is inside the tube, it will generally cut off the electrolyte, and render the liquid wire useless.

A number of bushings are used in forming gas and electrolyte tight seals which are tough and flexible, and to bond the materials of the transducer together so that they will withstand pulling and pushing during installation in the storage cell. A double bushing DB comprises a small bushing SB with a large bushing LB cemented over most of the length of the SB. The length of a particular SB may be $\frac{3}{8}$ to 1 inch, but it is always constructed using PVC-105-16 clear stock tubing having 0.063 inch inside diameter, and 0.016 inch thick walls. The length of a corresponding large bushing LB is generally slightly less than the matching SB, but it is always cut from PVC-105-10 clear stock having 0.106 inch inside diameter, and 0.016 inch walls. A joining band JB will also use the No. 10 stock, and a fastening bushing FB will use a similar No. 7 stock tubing having 0.145 inch inside diameter.

A liquid wire tube is constructed using a 4 inch length of PVC-105-22 clear stock tube having 0.032 inch inside diameter, and 0.012 inch thick walls. The long fiber nylon bundle N, packed into the liquid wire tube, is the same material N as described in the preceeding section 4.3.

There is evidence that these materials are not as stable in dimension with time and temperature as is desired, but they are the best currently available here, and are usually adequate.

To fill the liquid wire tube with the nylon N, first push a doubled back No. 28 HF pair leader through the PVC tube — cut ends first. Prepare a bundle of nylon fibers of thickness such that it will half fill the tube, cut the nylon to 20 inches length, and pass it through the loop in the end of the leader so that the double thickness of the nylon bundle is now 10 inches long, and a really snug fit in the liquid wire. Pull the bundle of nylon fibers through the tube with the wire leader while pushing the tube over the nylon bundle, and continue until the nylon "loop" held by the leader is extended to about 2 inch beyond the end of the PVC tube. Keep the nylon loop, and a "tail" at the other end, clean and intact for later assembly. The tail will be used to wrap the reference electrode, and the loop will be used to wrap the sensor electrode, so that there will be a capillary path which cannot be blocked by a gas bubble, over the full distance from the reference to the sensor electrodes.

The sensor and reference electrodes S & R are constructed using the same material as specified in the preceeding section 4.3 with similar 1.25 × 0.2 inch double grid sections of the same sponge lead material in a lead-antimony grid, as ordinarily found in the dry charged negative plates of a lead-acid cell. The grid should be intact, with no break in the lead-antimony surrounding the lead. Large sectors of lead-antimony are to be avoided.

The measuring wires 1 & 3 are cut from Alpha No. 1551, No. 22 gage stock, having 7 strands of No. 30 tinned copper wire, and PVC insulation. Orange wire is used for the reference electrode lead 1 because it is ordinarily positive, and yellow is used for the sensor electrode lead 3, which is ordinarily negative. This pair of measuring wires is to be twisted later into a wire cable WC, which may be 3 to 30 ft. or more long to suit the application, and is terminated in crimp-on terminal lugs which act as terminals 2 & 4.

Two sulphuric acid solutions are required. The first is later used for activating the reference electrode R, before final assembly, and after that for activation of the sensor electrode S. The desired concentration of 450 g/l is found in the electrolyte commonly sold for filling dry charged batteries requiring 1.265 specific gravity electrolyte. The second solution is prepared by diluting the first with distilled water to a concentration of 250 g/l, which is just slightly stronger than half and half. This will be used for filling the container of reference electrolyte PVC-R, and also the inside of the tube of the liquid wire LW, so that the acid will fill the voids and spaces in the nylon bundle N. A 3 cc medical syringe with a steel needle at least one inch long is used for filling the reference through hole F, which will be made by the needle of the syringe.

Assembly of Transducer Materials FIG. 4

The container of the reference electrolyte PVC-R may be sealed as shown on the right hand side of FIG. 4, at SE-PC. To do this, cement PC is placed about $\frac{1}{4}$ inch inside the end of the black tube PVC-R, the end is firmly clamped flat over about $\frac{1}{4}$ inch, and cement is added to the cut off end. The hole F will be made and used later.

To connect the orange measuring wire 1 to the reference electrode R, find a fairly strong sector of lead-antimony grid at the end of the electrode, scrape and tin well with solder, over at least 0.15 inch. This grid should be strong and solid after the wire is attached. Place a $\frac{3}{8}$ inch small bushing SB over the insulation of wire 1, strip, tin, and solder the wire to a 0.15 inch length of the grid, assuring that plenty of fresh solder is used to make a solid joint over a large area so that a slight ammount of acid will not later disrupt the joint. Repeat the above with the sensor electrode S and its yellow measuring wire 3.

Apply liquid cement PC to the solder joint, wire end, and all exposed surfaces of the lead-antimony grid, but not to the sponge lead active electrode material. Push the small bushing SB down over the cement on the end of the insulation on the wire so as to abut the solder joint, while the cement is still wet. After the cement is set, apply a second coat. When this is set, there is formed a double layer of acid tight PVC cement film around all copper, solder, and outer grid material which might otherwise interact, in a process called local action, with the acid and sponge lead, to degrade the electrode. The result is an electrode of nearly pure dry charged sponge lead metal, having an effective surface area many times greater than the 1.25 × 0.2 inch geometric area because of the porous nature of the sponge lead material.

Place two double bushings DB on the reference electrode measuring wire 1. A $\frac{3}{4}$ inch SB covered with a slightly shorter LB, is placed and cemented about 1 inch from the connection to the electrode R, as shown in FIG. 4. A $\frac{1}{2}$ inch SB, covered with a slightly shorter LB, is placed further down the wire, and not cemented. The $\frac{3}{4}$ inch DB will be used in sealing off the reference container at its left end at SE-PC, and the $\frac{1}{2}$ inch DB will be used to secure wire 1 to the left hand end of the sensor protector PVC-S.

Soak the reference electrode R for more than 2 hours in the bath of sulphuric acid of concentration 450 g/l. This has the effect of activating the sponge lead material. Since a fair ammount of gas is liberated in the process, and other reactions may occur, it is best accomplished before the reference electrode is sealed in its container PVC-R. The sensor electrode S is also preferably soaked at this time, but it is not essential because the gas and other reaction products can later be removed through vent holes VH. Once wet, it is important that can electrode not be allowed to dry in air, as this will destroy the "charge" and may make it useless.

Cement the liquid wire LW to a DB having a 1 inch SB and $\frac{3}{4}$ inch LB, at a point near the end of the liquid wire having the loop. Form a U in the tube of the LW, and push it into the open end of the reference container PVC-R. Twist the tail to form a light mesh of nylon around the reference electrode R, and at least partially cover both of its surfaces, and push the electrode R and the liquid wire into the container, as shown in FIG. 4, to a point where the DBs are near the end of the container. Wipe all surfaces clean of acid, apply cement PC, with discretion, to all uncemented mating surfaces, and then push the two DBs into the tube PVC-R, in unison, up to about half their length. The protruding portions of the double bushings will be used to secure the sensor protector PVC-S to the tube PVC-R.

To install the sensor protector, arrange measuring wire 1 so that it passes through PVC-S, with a ½ inch DB on the left. Place a similar ½ inch DB over the PVC insulation on the sensor wire 3. Pass the sensor S through PVC-S from left to right, place the loop of nylon N around the sensor electrode, so as to form a light covering of nylon fiber over essentially all of the active surface of S, and then push PVC-S down over the electrode S while keeping the measuring wire 1 over a flat surface sector of S, which now has a nylon covering, and also while keeping the vent holes VH in PVC-S arranged opposite the flat surfaces of S, and continue pushing until protector PVC-S is about to overlap the double bushings protruding out of PVC-R. Apply cement PC to all mating surfaces which are not yet cemented, and move the sensor protector down over the double bushings until the end of PVC-S meets the end of PVC-R, and thus forms a continuous tube. This completes the seals SE-PC shown in FIG. 4. The result is a gas and acid tight enclosure for the electrolyte to be put in the reference container, with only the liquid wire and the reference measuring wire connecting the reference electrolyte to the sensor sector.

The left hand end of the sensor protector is closed off, and both measuring wires 1 & 3 are secured, by cementing PC double bushings DB inserted in the left hand end of PVC-S as shown in FIG. 4. Joining band JB is cemented close to PVC-S to keep wires 1 & 3 together, and fastening bushing FB is placed over the measuring wires, but not cemented. It will be used when the transducer is later installed in a cell as shown in FIG. 5. Wire cable WC is formed by twisting wires 1 & 3, and the terminals 2 & 4 are provided now or at a later time, by crimping on lugs which will be used for joining the transducer to an amplifier as shown in FIG. 6. If the sensor S has been soaked in acid, the transducer should be kept wet with acid, at the sensor end PVC-S, from this time on.

The last step is to fill the reference container PVC-R and the liquid wire LW with the reference electrolyte of concentration $C_R = 250$ g/l. Insert the needle of the hypodermic syringe at the point labled F to the right of FIG. 4, taking care not to abraid the reference electrode R, and keeping the rest of the transducer elevated above F so that the air will be driven out, and put reference electrolyte into PVC-R under pressure. Then withdraw gas and air with the syringe by inverting the transducer so that the gas reaches the tip of the needle. Repeat these steps of filling with acid and pulling out gas. Eventually the pressure will move the electrolyte through the liquid wire, and a few drops will touch the sensor electrode. A sharp change in the reading of a millivoltmeter connected to the transducer terminals 2 & 4 will show when the electrolyte passed through and filled the liquid wire. The first indication may be over 100 mv, but this diminishes quite rapidly if the sensor electrode has been preactivated. Otherwise, it may take several hours, or more.

After the excess acid has been wiped away, the hole F is closed with several coats of cement PC, so that it will withstand internal pressure resulting from the force of pushing the transducer into a storage cell through a relatively small electrolyte fill tube.

This completes construction of the second transducer. However, it is best to calibrate both the electrochemical potential $e_x$ and the internal resistance $R_{LW}$, using the procedure outlined in the preceding section 4.2, entitled Basic Structure. The measurements of potential $e_x$ should be in agreement with FIG. 2. Resistance $R_{LW}$ can be determined by observing the near short circuit current $i_L$, and the open circuit potential $e_x$, and doing the usual computation. The result should be near 10,000 ohms.

CONCENTRATION GAGE

A concentration gage is constructed by placing this transducer in a large barrel of a syringe so that it can be readily exposed to a number of electrolytes. The potential $e_x$ in FIG. 1 is then a measure of the concentration of an unknown electrolyte or acid.

Transducer Installation in a Battery Cell FIG. 5

It will be observed that the illustration of the drawing FIG. 5 is quite schematic. For example, the buss bars connecting the plates PT of the cell, and the terminal posts used to get energy out of the cell, are omitted to avoid cluttering the drawing, because such details are shown in Knowlton, Ref. A.

FIG. 5 shows the transducer of FIG. 4 mounted in a cell of a lead-acid storage battery BATT, such as a Gould Power Breed Electric Vehicle 220. This has a case BC and plates PT which are held seperated from one another by porous spacers SP. A sensed electrolyte of concentration $C_S$ fills the cell and covers the plates and practically all of the transducer up to the normal sulphuric acid $H_2SO_4$ fill level AL, which nearly reaches the bottom of the fill tube FT. It is important that the sensed electrolyte cover the vent holes VH in the sensor protector PVC-S which surrounds the sensor electrode S.

To minimize an extraneous output potential $e_x$ which might otherwise occur when a large current flows in the sensed electrolyte around the plates, the sensor sector of the transducer is preferably mounted so that it is not overly close to any one plate, and also so that the long axis of the sensor electrode S is normal to the long axis of the plates. It is also best to orient the vent holes VH so that they are generally horizontal — not placed so that one array of vent holes is close to the plates. It will often be necessary to bend the transducer at some parts of the reference sector to accomplish this, so part of the reference sector may lie parallel to the plates of the cell.

After the transducer is inserted through the fill tube FT, the measuring wires 1 & 3 should be brought out through a small hole DH in the top of the case to avoid obstructing the plug which is inserted in the fill tube, and also to secure the transducer in place above the plates of the cell. To simplify getting these wires out through a hole small enough to prevent acid escaping during normal service, a small slit is cut in the case from the fill tube to the hole, and then closed after the wires are in place.

Drill the small hole DH in the top of the battery case BC at a point adjacent to the fill tube FT, and opposite a gas vent slit cast in this tube. Use a No. 35 (0.110 inch) drill to make DH, and to form a small slit in the plastic wall of FT, from the hole DH to the top of the gas vent slit, and on up the side wall of the tube FT to its top. This added slit is just big enough to allow passing the measuring wires 1 & 3 from the fill tube FT over to the drilled hole DH.

Insert the transducer assembly into the cell through the fill tube FT — reference sector PVC-R first — with a bend if required, and push the sensor sector PVC-S down through the fill tube at a point near hole DH.

Move the transducer away from the fill tube and transfer the measuring wires 1 & 3, singly, through the added slit to the drilled hole DH. Pull these wires snug, and inspect the installation with a dental mirror and small lamp to determine that the sensor sector is located in the manner stated above.

Measuring wires 1 & 3 are preferably pulled snug and tight as the preferred placement is accomplished, so that the transducer will thereby stay in place when subject to vibration, etc. This also places the joining band JB against the bottom of the hole DH so as to prevent acid from escaping during normal service. After wiping away any acid, push fastening bushing FB down on wires 1 & 3 until it is firmly placed against the top of the battery case, and then secure FB with cement PC. The outer skirt of FB may be secured to the top of case BC with a new cement, which adheres to both PVC material and the plastic material of the battery case. This cement is also used to close the added slit in the top of the case, over the short distance to the wall of the fill tube FT, and on up this wall. This last cementing step will prevent the minor escape of acid which might otherwise occur.

It is apparent that the above proceedure will be simpler and less costly if the transducer can be placed in the cell before the cover of the battery is cemented to the sides of the battery case. It may also be preferred to use a push-on connector for mounting terminals 2 & 4, and for securing the transducer to the top of the case. This connector could be cast into the top of the case before installation of the transducer, and would provide good means for making an acid tight seal at the left hand end of the transducer, replacing feed through measuring wires 1 & 3.

Having completed the installation of the transducer in the cell, it is desireable to calibrate the combination of the transducer and the cell as outlined in the preceeding section 4.2 — Basic Structure — Battery Gage. The result should be in general agreement with FIG. 3 if a comperable battery is used, and the source resistance of the electro-chemical potential should still be about 10,000 ohms, when measured using the usual open circuit potential and short circuit current method.

Predicted Performance

The general relations used to predict the performance of the first transducer in the preceeding section 4.3 — Design calculations — are likewise used here to predict the performance of this second transducer.

Most of the parameters used to predict acid mass transport by diffusion can be obtained from the dimensions of the transducer. The volume of reference electrolyte $V_R$ is about that of the tube cut to $4\frac{3}{4}$ inch length, because of the space used by the electrode and the liquid wire, so $V_R = 2.65$ cm³. Then $M_R = 0.663$ g acid in the reference container holding electrolyte of concentration $C_R = 0.250$ g/cm³.

To predict the time T for 5% of this mass of acid to be transported ($M_T = 0.033$ g) through the liquid wire of length $L = 10.2$ cm and cross-section area $A = 0.00661$ cm², note that the effective area $A_e$ of this structure is only 0.2 times the geometric area A, so $A_e = 0.00132$ cm², and further, that in the worst case the cell will always be charged, so that $C_S = 0.450$ g/cm³, so the concentration differential is $dC = 0.45 - 0.25 = 0.2$ g/cm³. The coefficient of diffusion is still taken as $D = 2 \times 10^{-5}$ cm²/sec., so the time to 5% mass transport is expected to be $$T = \frac{L\,M_T}{D\,A_e\,dC} = $$

$$\frac{(10.2)(.033)}{(2 \times 10^{-5})(.00132)(.2)} = 6.4 \times 10^7 \text{sec.} = 2 \text{ years.}$$

This two year time is the period in which the electrochemical output potential $e_x$ is expected to change its zero origin less than 5% as a result of diffusion of sensed electrolyte acid into the reference container. This diffusion is the only known predictable cause of zero drift. Extraneous drift could result from inputities in the electrode material, or in the electrolytes, or from improper processing.

The resistance of the liquid wire can be predicted using the effective resistivity $p = 1.4$ ohm-cm, in the usual relation $$R_{LW} = p\frac{L}{A_e} = 1.4\frac{10.2}{.00132} = 10,800. \text{ ohms.}$$

These predictions are reasonably well supported by experimental results using this structure and process, and also other related structures specifically designed for accelerated life testing.

4.5 AMPLIFIERS FOR THE TRANSDUCER FIGS. 6, 7, & 8

The power which can safely be taken from the transducer of the present invention is ordinarily small, because it is usually required that the transducer be small in size and stable in electric output potential over a long time interval. The means utilizing the electric output to indicate acid concentration, or battery state, or to control a charging apparatus used to restore the chemical energy of the cell will, ordinarily, require measuring or control current input in excess of that available, so an amplifier is frequently interposed between the transducer and the indicating or control apparatus. Those skilled in the art will know many ways to construct such an amplifier once they have learned the requirements. These are outlined in connection with a discussion of FIG. 6, which shows a battery with a transducer matched to an indicating meter by a transistor amplifier, so that the meter will show the state of the battery.

Two amplifiers are described in connection with FIG. 7 & 8 to more specifically show the requirements of an amplifier, and to describe two versions of a new design approach, which is observed to be unusually effective and economical in the general environment of an electric vehicle.

This new design approach is applied to the Norton transistor integrated circuit described by Frederiksen, et al, Ref. E. It is basically a current differencing device, with a relatively low input resistance, which is frequently not well suited for use with the transducers of this invention. Yet it is most attractive because of the four good quality amplifiers in a small package operating on a single unregulated power supply of 4 to 36 volts — all for about $1 in unit quantity. The circuits shown in FIGS. 7 & 8 show two applications of this new design approach, which is used to convert one of the low resistance inputs to a very high resistance input by floating the entire common or ground bus of all four amplifiers, and making it responsive to one input. Then the common can be the input to other amplifiers, and many design options are available. It will be obvious that this new approach is general, and directly applicable to a number of amplifiers by application of the general design method illustrated in these circuits and in FIG. 10.

Figure 8:
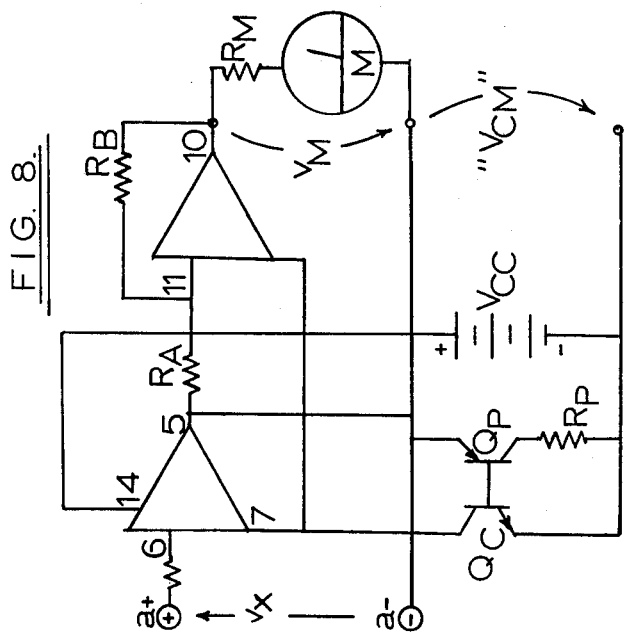
FIG. 8 shows a portion of FIG. 7 with modifications to provide for a portable instrument wherein there is no external connection between the transducer terminals and the cell being sensed.

It will be appreciated that the circuit diagrams shown in FIGS. 6, 7, & 8 are strictly electrical schematics drawn to illustrate the general principles described in connection with a discussion of these figures and the rest of the specification. There will be almost as many ways of constructing an amplifier and attaching an indicating device as there are persons doing the work, so I present only the basic approach and detail necessary to construct an embodiment.

A Battery State Indicator FIG. 6

The transducer of the present invention is represented by a new schematic symbol which will be seen to broadly resemble the transducers shown in FIGS. 1 & 5. Also shown in FIG. 6 are a battery BATT, direct current amplifier G, and indicating meter M connected with the transducer, so that the combination can function as a battery state indicator. Load and charging apparatus may be connected to the battery at the + & − terminals as shown in FIG. 1, but these are omitted here for clarity. The negative battery is often grounded by connection to the earth terminal E.

The transducer shown in FIG. 6 has a reference terminal 2 coupled to the reference electrode R which is mounted in a reference container, which is in turn joined to the sensor sector through the liquid wire resistance $R_{LW}$. Further, the sensor electrode S is mounted in the sensor sector which opens into the second cell of the battery having electrolyte of concentration $C_S$, and is coupled to sensor terminal 4. This sensing of the second cell results in a common mode voltage $V_{CM}$ at terminal 4 which is ordinarily about 2 volts positive with respect to the − terminal, which is returned to earth E. This establishes the two input terminals of the amplifier G at a potential above earth under all operating conditions, so as to reduce the overall cost by permitting the use of a single power supply of voltage $V_{CC}$, which is frequently the battery measured. There is a further advantage to this connection in that a few microamperes charging current $i_{CM}$ for the sensor electrode can be drawn through resistor $R_{CM}$ to compensate for the discharge current which may result from the use of temperature compensating resistor $R_L$. The positive + battery terminal is typically at $+V_{CC} = 6$ to 12 volts, so that it may be used to power the amplifier G which drives the indicating meter M.

Transducer terminals 2 & 4 normally connect to the positive $a+$ and negative $a-$ input terminals of the amplifier, which has output terminals 10 and 9 connected to meter M having internal resistance $R_M$. The output voltage $v_x$ of the transducer will be its electrochemical potential $e_x$ less the drop in voltage in the liquid wire resistance $R_{LW}$ due to current $i_L$ flowing in temperature compensating resistor $R_L$, assuming that the input terminals of the amplifier draw no current. The common mode current $i_{CM}$ will have a neglegable effect on $i_L$ and $v_x$ because the effective resistance between the sensor terminal 4 and the earth E will be only a few tens of ohms.

Electro-chemical potential $e_x$ will be close to 38 mv when the battery is fully charged. If $R_{LW} = 10,000$ and $R_L = 5000$ ohms for good temperature compensation, then $v_x$ will be 12.7 mv at room temperature. If the voltage gain of the amplifier G is 10, its output to meter M will be 127 mv. Then a 200 ua. meter having 500 ohms resistance will read full scale when $R_M$ is increased by an added 135 ohm calibrating resistor. On the other hand, if the battery is at freezing temperature, and has apparently lost available energy because of an apparent loss of available charge and increased internal resistance, the liquid wire resistance will have increased to about 1.6 times its room temperature value, and this will reduce $v_x$ to 9 mv, so that the meter will indicate that only 71% of the normal energy is available. When the battery is calibrated, it may be observed that the energy available at freezing temperature is quite close to 71% of that available at room temperature. If not, resistor $R_L$ and the gain of the amplifier can be adjusted to give meter readings indicative of the energy available at various temperatures.

It will now be apparent that the information given in this specification is sufficient for a person skilled in the art to design and construct a temperature compensated battery state indicator utilizing the transducer of the present invention. Means whereby apparatus for controlling the charging current of of the battery can be connected to the output of the amplifier G, will be likewise apparent to those skilled in the art after reading this and other sections of the specification.

Two Direct Current Amplifiers FIGS. 7 & 8

FIGS. 7 & 8 are schematic representations of the basic form of an amplifier having cost and performance advantages over previously known circuits. They use the National Semiconductor LM 3900, described by Frederiksen, et al, Ref. E., so the corresponding pin numbers (3, 4, 7, 8, 10, etc.) are shown on the drawing. The circuit in FIG. 7 is intended for use when the negative battery is returned to the amplifier, whereas the circuit in FIG. 8 is preferred in a portable amplifier having an independent power supply.

A Charge State Indicator Amplifier FIG. 7

The circuit shown in FIG. 7 is well suited for use as the amplifier G shown in FIG. 6. The approach illustrated in FIG. 7, to meet the requirements mentioned previously, is generally explained and illustrated as follows:

In the prior art, the common bus connected to pin No. 7 of the of the LM 3900 is grounded to the negative power supply. However, in the approach indicated in FIG. 7, the common bus 7 is made to follow the potential of the input terminal $a+$, so that the common bus 7 is available as an apparent input for another amplification sector of the same LM 3900 integrated circuit chip. If even a minute current flows through coupling resistor $R_6$ and on into inverting input 6, the output 5 will go more negative, so the base of inverting transconductance amplifier transistor $Q_C$ will draw less current from coupling voltage divider $R_{5a}$ and $R_{5b}$. Then the collector of $Q_C$ will draw less current to the powersupply reference E, and so the potential of common bus 7 will thereby increase, because there is a constant bias current flowing into the $+V_{CC}$ power supply pin 14 of the integrated circuit. The high gain loop feedback holds the potential of pin 7 at almost exactly one diode voltage below input potential $1+$, and prevents this input from drawing any but the most minute current — typically 30 nanoamperes. Then pin 6 operates as a very high impedance input, drawing only neglegable current from the transducer reference output terminal 2.

Transducer sensor output terminal 4 has an impedance to negative battery of only a few tens of ohms because the electrolyte path from the sensor electrode S has a very large area, so terminal 4 can be coupled to and used to drive the $a-$ input of the amplifier, which is a low impedance input. A potential appearing at inverting input 11 is referenced to the common bus 7, which is another apparent input for amplification sector 11-10, so the output 10 will respond to the difference between these inputs. Operational amplifier feedback resistors $R_B/R_A$ set the closed loop voltage gain of the differencing amplifier. The result is that the output at pin 10 is a voltage $R_B/R_A$ times the potential difference between the input terminals $a+$ and $a-$. The single diode voltage drop appears equally at each input, so this cancels. However, there may be a small offset bias on output 10.

This output offset bias may be temperature dependent, or there may arise other problems due to an unbalanced output, so another, and as yet unused, amplification sector of the LM 3900 quad having input 8 and output 9 is connected with correspondingly valued resistors $R_a$ and $R_b$, to supply a temperature compensated idling reference for connection to the negative terminal of the meter M. Bias and thermal problems are effectively cancelled out in this manner. Changes in power supply potential $+V_{CC}$ have negligable effect on the indication of the meter because of the constant current nature of the internal power regulator of the LM 3900, and because of the ballanced form of the circuit in which it is connected.

This circuit will respond to the 0 to 38 millivolt input $e_x$ with an overall precision, excluding meter errors, of about $\pm 3\%$ when: $V_{CC} = 5$ to 35 volts, $V_{CM} = 0.7$ to 4 volts, $R_{LW} = 7000$ to 20,000 ohms, temperature = 0° C. to 70° C.; and the component values are $R_B = 100,000$, $R_A = 20,000$, $R_{5a} = 4000$, $R_{5b} = 1000$ ohms, $Q_C =$ 2N3569, M = 0 to 200 ua. at $R_M = 500$ ohms; and various calibration and noise supression resistors (such as $R_6$) and capacitors are coupled to the circuit as required, in a manner which will be understood by those skilled in the art. These are here omitted for clarity.

The overall assembly is reduced to a size which fits inside the case of a 2½ inch panel meter without disturbing its movement. When the transducer of FIG. 4 is mounted in the battery cell as shown in FIG. 5, and connected to this amplifier and indicator, there is formed a charge state indicator which can be placed on the instrument panel of an electric vehicle. All necessary connections can be made to the back of the meter. This charge state meter uses so little power, typically less than 10 ma. at 12 volts — that the power connection may be left on at all times. This simplifies switching, protects the electrodes from discharge, and makes the indicator more convenient to use.

A Portable Concentration Gage Amplifier FIG. 8.

A portable transducer, such as that used in the concentration gage of section 4.2, will ordinarily be matched to an indicator by a portable amplifier having a pair of input leads connected to the transducer, but no coupling to a power supply reference terminal such as the negative battery. And a portable amplifier may be wanted for sequentially measuring the outputs of the first described transducer in section 4.3; or for measuring the potential of the second transducer in section 4.4 when it is used to sense the strength of sulphuric acid in an industrial process having no association with a storage battery. In any case, there will be no common mode voltage, so one needs to be built into the amplifier. This can be done as shown in FIG. 8. The two input terminals are $a+$ and $a-$, and the input potential is $v_x$.

The common bus 7 still follows the potential of the $a+$ input coupled to the inverting input 6, but in this case the base current of inverting transconductance amplifier transistor $Q_C$ is derived from the base of transistor $Q_P$ which replaces coupling divider $R_5$. Transistor $Q_P$ also serves as a low impedance emitter source of a "$V_{CM}$," or a "common mode" potential to which the $a-$ input can be referenced. This emitter is also the reference for the gain determining resistors $R_B$ and $R_A$ for amplification sector 11-10. The differencing in amplifier 11-10 is between the $a-$ and the common bus 7, which follows the $a+$ input. The meter M is coupled to the output 10, and returned to the emitter source because there is usually no need for extra precise temperature compensation of an indicator used indoors. The resistor $R_P$ in the collector return to negative power supply terminal $-V_{CC}$ for transistor $Q_P$ is adjusted to a value which minimizes Zero shift when the gain is switched. This gain switching provides for a meter sensitivity ranging from $\pm 500$ mv fs when $R_A$ is open circuit to $\pm 5$ mv fs when $R_A$ is 2700 ohms; $R_B$ held at 68,000 ohms. Meter M is preferably a 200 ua. movement having 500 ohms resistance. Several calibration and noise supression resistors are omitted for clarity, but persons skilled in the art will understand their use. Small batteries, adding up to $+V_{CC} = 4.5$ volts will suffice for the power supply because the drain is less than 10 ma.

4.6 A DOUBLY RESPONSIVE CHARGING CONTROLLER FIGS. 9 & 10

This section describes a currently preferred method and means for constructing a battery charging apparatus which uses the transducer of this invention to regulate the charging current to a lead-acid cell, so that automatic charging is rapid and complete without overheating or overcharging or excess gas generation. Both the electro-chemical potential and the resistance of the transducer are used as signal inputs to a controller which governs the operation of the rest of the charging apparatus. A Norton amplifier integrated circuit is shown used to provide the required gain and signal selection.

It will be remembered that a controller K was included in the Charging Current Regulator described in FIG. 1 and section 4.2, under Measuring and Control Applications. This controller is constructed to be doubly responsive to the transducer. The output of the controller responds to both the potential $e_x$ and to the resistance $R_{LW}$, and governs the action of the charging control input F and the charging device C which drives a charging current $i_C$ into the battery BATT. Thus, the charging current is regulated by the transducer — by the potential which is a measure of charge state, and also by the resistance which is a measure of battery temperature.

The object of the present discussion is to show how to construct this doubly responsive controller K. This is done by a general discussion of the approach, and also by a discussion of a particular presently preferred embodiment. Those skilled in the art will realize that there are other ways of accomplishing the needed result. They will also realize that there are many more ways of constructing alternator or SCR devices which will function as the charger C and the charging control input F to provide charging current $i_C$ at a suitable voltage $V_C$, all on command of the output voltage $v_F$ from the controller K, so only the controller K will be detailed here. The components F & C in FIG. 1 are here lumped into a single linear source of charging current, defined as the transconductance $$G_M = (d\ i_C/d\ v_F).$$

One can think of this transconductance as a power amplifier for direct current. For a good sized battery, the charging current will change about 200 amperes in response to a controller input signal change of about ½ volt, so the magnitude of $G_M$ is about 400 amperes per volt.

Controller Logic

This controller differs from the usual in that it uses the linear logical OR approach: The charging current is reduced below the maximum value calculated from the ampere-hour law if the battery is nearing full charge state ($e_x$ approaches +40 mv), OR if the battery is approaching its maximum temperature of 110° F ($R_{LW}$ has fallen well below normal resistance).

This method provides for a fast and automatic charge, and appears to satisfy the requirements stated by Dr. Woodbridge — Ref. A., paragraph 89, — "In general, any rate which does not produce excessive gassing or a cell temperature exceeding 110° F. is permissable." Charging can begin at a current somewhat less than the ampere-hour rating of the battery if it is cool and fully discharged. This continues until the temperature gets noticably above and cuts the current because the transducer resistance is decreased, OR until substantial gassing occurs and stirs the fresh acid generated by the charging current into the sensing area of the transducer above the plates, and thereby reduces the current because the potential is increased. If charging is begun when the battery is already partly charged, the initial current will be held down by the transducer potential. If the battery has been heated to 100° F. by being much used or in a hot environment, the initial current is limited by the transducer resistance. A severely high temperature or dangerous gassing could result if both factors were not considered.

A simpler method would be to add the thermal signal to the potential signal, and govern the charging current with the sum of the transducer's responses. However, this would have disadvantages. Charging could be finished only when the battery had fully cooled and so would take a much longer time or never be done in a hot climate, because batteries hold heat generated in charging for many hours. If the current were simply switched completely off at the maximum temperature the current surges would be great and gassing could be severe. And if current were cut off only at full charge and made proportional to the temperature the gassing could be dangerous.

What is needed is proportional current control by the greater of two signals — Potential which is a measure of charge state, OR resistance which is a measure of temperature. I call this the linear logical OR approach, but a more exact statement would be: linear closed loop control by selection of the greater of a charge state or a thermal state signal.

This function can be implemented using a switched bridge including the transducer as one leg, gated amplifiers which sample and hold a signal which is responsive to only one state signal, and a selecting amplifier which responds linearly to only the greater of two state signals. This selected output $v_F$ is the output of the controller K, and also the input to the transconductance $G_M$, which produces the battery charging current-polarized so that the current is linearly decreased as $v_F$ increases. Of course, linearity of $G_M$ is not a practical requirement, but it is an analytic convenience.

Signal Seperation Using a Switched Bridge FIG. 9

It will be realized that there are many ways to seperate two state signals; a direct current potential $e_x$ and a source resistance $R_{LW}$. The present way is now preferred because it is relatively trouble free, inexpensive, and simple to analyze and adjust.

The transducer having terminals 2 & 4 is represented in FIG. 9, as a battery $e_x$ in series with a source resistance $R_{LW}$. This is shown connected in a bridge circuit having output terminals 2 & 5 and an output potential $e_{25}$. Bridge driving terminal d has two resistors $R_{d2}$ & $R_{d5}$ connecting a potential $V_D$ through a periodically operated switch SW to the terminals 2 & 5. These two resistors are generally equal and called $R_d$. The bridge is completed with temperature comparison resistor $R_T$, which is in the leg adjacent to $R_{LW}$. Resistor $R_T$ is generally made equal in magnitude to the transducer resistance $R_{LW}$ at a cool temperature such as 70° F. The value of resistors $R_d$ is typically greater than $R_{LW}$ to avoid severe attenuation of potential $e_x$.

When the switch SW is open, $e_{25}$ is solely due to $e_x$, and will be close to its value if the resistors $R_d$ are large. This provides for the isolated potential output. However, when the switch is closed, the output will be a function of both $e_x$ and the thermally dependent $R_{LW}$ because source voltage $V_D$ is connected into the bridge. At the resistance ballance temperature where $R_{LW} = R_T$, the output $e_{25}$ will be an attenuated version of $e_x$, but as the battery gets hotter the output will increase in the same sense or polarity as a positive $e_x$. This is the thermally dependent output, but it is combined with the charge state dependent output.

The switch SW is typically a transistor chopper, driven by a clock current at a frequency of several hundred Hertz. The output of an amplifier driven by $e_{25}$ has the potential, and then the resistance plus potential, state signals appearing sequentially. They need to be seperated, so a following amplifier is gated to store only the potential state signal; and another amplifier is gated to store the sum of the potential and resistance state signals, but it has a subtracting input from the stored potential signal, so this latter stored signal is only the seperated resistance state signal.

These two independent and seperately stored state signals are compared, and the greater is selected for linear amplification in still another amplifier. This becomes the output $V_F$ of the controller K which governs the transconductance $G_M$.

A doubly Responsive Controller FIG. 10

A currently preferred way to construct a particular doubly responsive controller is shown in FIG. 10. This includes a bridge, and performs the separating functions stated above.

A transducer having potential $e_x$ and resistance $R_{LW}$ and terminals 2 & 4 is placed in the No. 2 cell of the battery BATT, which is charged with current $i_C$ from POWER AMP $G_M$. This is shown as a linear element for analytic simplicity, but in practise it is frequently quite non-linear, and this may have practical advantages. The point is that it is a more-or-less proportional device. The transconductance is preferred not to be a full on to full off device with a long time interval like 15 minutes between changes of state. However, it may be a duty factor modulated power control device, switching in a fraction of a second from one state to another, with an average current output which is more-or-less proportional to the input signal $V_F$.

The amplifying and selecting functions are accomplished using two LM-3900 Norton amplifier quads. This integrated circuit and its application are thoroughly discussed in Ref. E. Each is used in a manner similar to that shown in preceeding section "A charge State Indicator Amplifier," and FIG. 7.

In FIG. 10, a BRIDGE output potential $e_{25}$ has two time sequential values because of the CHOP switch SW, which is driven by the CLOCK. This switch is gated off during time interval $a$ by clock output current $b_{i1}$. At this time, $e_{25}$ represents only the transducer potential $e_x$.

Both terminals 2 & 5 are at a relatively high impedance, so two very high input impedance amplifiers Hi Zi are provided. These comprise amplification sectors 6-5 of each of two LM-3900 ICs, and their associated common transistors $Q_C$. The "high" input of terminal 2 is coupled to pin 6 of an IC having a common pin 7 which is labled 72 in FIG. 10. The common line current of all four amplification sectors of IC No.2 is returned to negative battery — and earth E by a common transistor $Q_{C2}$ having its base coupled to pin 5. Thereby the potential of pin 72 is made to follow one diode voltage $V_D$ below the potential of transducer bridge terminal 2. This serves both as the source of potential $V_D$, which is chopped into the bridge by the switch SW, and also as a low impedance source for the following GAIN stages.

The "low" input potential from transducer bridge terminal 5 is similarly followed — less one diode voltage $V_D$ — by common pin 75 of IC No. 5. Its common current is similarly sinked by common transistor $Q_{C7}$ having its base coupled to this pin 5. The line 75 is thereby a low impedance source to drive the inputs of the following GAIN stages, and it is also the common, or low output of the controller K, for driving the POWER AMP transconductance $G_M$ over the jumper wires ff.

Thereby the potential $e_{25}$ appears across lines 72 and 75. This potential is first amplified in gain sector 3-4 on line 72. The operational amplifier gain to pin 4 is $$R/R/3 = 3.$$

The bias potential of pin 4 is $3V_D$ above line 72, so it is used as a regulated power source for the clock. This clock is a fairly conventional multivibrator and gate current source operating at a period of 7 milliseconds.

This same pin 4 also drives a second gain sector 3-4, but this one is on line 75 and in IC No. 5. Its output pin 4, which is labled $E_X + E_T$ in FIG. 10, has a gain of 4 times $e_{25}$ because the operational amplifier gain is $R/R = 1$, and its input is derived from the preceeding gain of 3, and there is added the one times $e_{25}$ input resulting from a switch of common reference from line 72 to line 75. Its bias potential is about one times $V_D$ above line 75 because of the R/3 load on input pin 3.

The pair of R/3 resistors loading these two input pins 3 may be adjusted differentially $(Z_{ex})$ to correct for small differences in offset of the transducer potential $e_x$, or in the ICs. This adjustment goes through to the output of the controller as a change in set point for only the $e_x$ state signal — not temperature. The thermal state signal is independently adjusted by $R_T$, or by the bridge resistors $R_d$.

The potential $E_X + E_T$ drives the two gated SELECT & STORE amplifiers, each having a gain of one for the selected signal. Amplification sector 8-9 is gated through during time $a$ by clock gate current $a_i$ which drives a transistor switch to a storage capacitor $C_9$, so that it is responsive to only $e_x$ because chopper SW is then open. The potential $E_{xs}$ stored by capacitor $C_9$ is 5 times $e_{25}$ because of the preceeding gain of 4, and one added $e_{25}$ resulting from the change of reference from line 75 to line 72. This output $E_{xs}$ goes to the MAX XELECT positive input pin 13.

During the other clock time interval $b$, when the CLOCK has turned on the CHOP transistor SW with clock current $b_{i1}$, the transducer resistance $R_{LW}$ will produce a bridge output potential $e_{25}$ if the transducer resistance does not match the temperature comparison resistor $R_T$, because of the bridge connection to $V_D$. This thermally dependent potential adds algebraically to the potential from $e_x$, which is charge state dependent. The sum is more positive as $e_x$ increases and the transistor resistance decreases.

The high input impedance Hi Zi, and the GAIN amplification path is the same for both the $a$ and the $b$ time intervals, so the summed signal $E_X + E_T$ appears with the same gain at the inputs to SELECT & STORE amplification sectors 8-9 and 11-10 on the 72 line. However, the output 9 is not passed by a gate to capacitor $C_9$, so its holds the previous $E_{xs}$ potential stored during time $a$. During time interval b, the transistor gate from pin 10 to capacitor $C_{10}$ is closed by clock current $b_{12}$, so $C_{10}$ stores $E_{TS}$ because the input pin 11 is fed by both $E_x + E_T$, and also by $-E_x$ from $C_9$. This gate to $C_{10}$ is open during time $a$, so the potential $E_{TS}$ is retained, and coupled through to MAX SELECT positive input pin 12. Both $E_{xs}$ and $E_{TS}$ are biased at about $+2V_D$ potential by input loading resistors R & R/3 on the input pins 8 & 11. This is to assure that, in the absence of a negative feedback current, both of the max select amplification sectors will always be biased positive, so that the diodes connected to outputs 9 & 10 will be operated in the foreward biased condition. The cathodes of both of these diodes are connected to the controller output $v_F$. This is loaded with a resistor R connected to earth and battery negative so as to provide a current drain to hold these diodes in the forward conducting mode, even if $V_F$ approaches zero, or goes slightly negative.

Both of the MAX SELECT amplification sectors 11-10 and 8-9 get equal negative feedback current from the output potential $V_F$ appearing across smoothing capacitor $C_F$. The operational amplifier gain of the sector having the greater Norton positive input current (pin 12 or pin 13) will have a gain $$(2R + R)/R = 3,$$

but the sector having the lesser input current in the positive sense will have near zero output, because the negative feedback current matches that of the stronger input, so the diode connected to the output of the sector having the lesser input current is reverse biased, carries to current, and hence the controller output $v_F$ responds to only the stronger input current, and it does this linearly. This is the maximum selection function.

The output of the controller is thus a linear function of the greater of $E_{xs}$ OR $E_{TS}$. The output bias potential for both state signals is adjusted to match the POWER AMP transconductance $G_M$, using set point SP resistor R/4, which adjusts a direct current bias through seperate R resistors to the negative input pins 8 & 11.

An alternative and much simpler design would provide for the controller output $v_F$ to follow the algebraic sum of $E_x$ and $E_T$. However, this will be seen to have problems. If the battery were cold and hence the thermal output negative, it would subtract from the charge state output, and the controller would produce a large current when the battery was charged, and this could cause excess gassing. Or if the battery were hot, charging could not be completed until the battery had been cooled — which can take hours. The linear logical OR approach described above has been found to have substantial advantages over the alternative, and is well worth the added complexity.

Controller Transfer Function FIG. 10

The overall transfer function of the particular controller design shown in FIG. 10 is evaluated with a view to showing quantatitatively how a particular type of battery can automatically and rapidly be charged in a closed loop control system constructed to match the battery characteristics.

The transducer is constructed to have a potential responsive to the charge state: $e_x = 0$ when discharged, and $+40$ mv when a 200 ampere-hour battery, with which it is associated, is fully charged. The transducer resistance is a measure of battery temperature:

$R_{LW} = 11,000$ ohms at 70° F., and
$R_{LW} = 8700$ ohms at 110° F.

The transducer is connected in a bridge having:

$R_T = 11,000$ ohms, and
$R_d = R = 33,000$ ohms, with chopping potential $V_D = 0.55$ volt at room temperature.

The bridge output $e_{25}$ is connected to a controller K having an output $V_F$ connected to a transconductance $G_M$ which drives a charging current $i_C$ into the battery as shown in FIG. 10.

It is found that the output potential of the bridge responds to the transducer potential with the same transfer gain in both states of the chopper switch SW. This partial transfer gain is $$(d\ e_{25}d\ e_x) = (R/R + R_T) = 0.75,$$

and when $e_x = 40$ mv, $e_{25}(40) = 30$ millivolts, in both clock states.

It is also found that the output potential of the bridge responds to the transducer resistance only during the time interval b, and that the partial transfer function is $$e_{25} = V_D(R_T - R_{LW})/(R + R_T).$$

The change in transducer resistance from ballance is defined by the dimensionless thermal factor $$DT = (R_T - R_{LW})/R_T.$$

Then the partial transfer gain is $$(d\ e_{25}/d\ DT) = V_D(R_TR + R_T)$$

$$= (0.55)(\tfrac{1}{4})$$
$$= 0.1375\ \text{volts/ohm/ohm}.$$

The thermal factor at 110° F. is $$DT\ (110) = (11,000 - 8700)/11,000 = 0.209,$$

and so $$e_{25}(110) = 28.75\ \text{millivolts}.$$

This is close to the value of $e_{25}(40) = 30$ mv, so when the controller K is callibrated to turn off the charging current at $e_x = 40$ mv, there will be only 4.2% of maximum charging current at a battery temperature of 110° F. and lesser $e_x$. This is low enough to generally prevent a further rise in temperature.

The bridge output potential $e_{25}$ has been shown to be amplified by $3 + 1 + 1 = 5$ in the GAIN stages, and by 3 in the MAX SELECT stage, so the overall controller transfer functions are $$(d\ v_F/de_x) = (0.75)(15) = 11.25,$$

and $$(d\ v_F/d\ DT) = (0.1375)(15) = 2.0625.$$

When the battery is charged so that $e_x = \times 40$ mv, the controller output $v_F$ is 450 mv. When the temperature is 110° F. and the transducer potential is less than 40 mv, the controller output is 431 mv, which is 4.2% less than 450 mv. Thus the controller essentially shuts down the charging current either when the battery is charged OR when it is at its maximum temperature.

The bias potential about which the $v_F$ signal deviates is close to zero with the values shown in FIG. 10. However, if the set point SP resistor of value R/4 is increased to R/2 the output bias will be increased to about $+V_D = 0.55$ volts. This can be used to calibrate the transconductance $G_M$ so that the charging current is matched to the battery.

The POWER AMP transconductance $G_M$ is constructed to match the controller and the specifications of the type of battery BATT used. When this is a 200 ampere-hour battery, the initial charging current into a fully discharged battery is 200 amperes, or less, if the ampere-hour law is used. In this case, a suitable initial current set in with the set point is $$i_C(0) = 180.\ \text{amperes}.$$

And a good transconductance is $$G_M = (d\ i_C/d\ V_F) = -400.\ \text{amperes per volt}.$$

The negative sign shows that a more positive controller input potential causes the charging current to be reduced.

When these values are used, the charging current will be 180 amp. at full discharge when $V_F = 0$, and zero when the battery is charged so that $v_F = 450$ mv, assuming that the battery temperature is always low enough so that the thermal potential never exceeds the charge state potential. However, if this is not the case, the thermal potential will override $e_x$ and take over control of the charging current, and at 110° F. battery temperature the charging current will be down to 7.5 amp. because $v_F$ will be at 431 mv.

Dr. Woodbridge, in Knowlton, Ref. A., paragraph 90, comments that "If the ampere-hour law is strictly followed, it can be demontrated that 90% of the ampere-hours out of the battery at the beginning of the charge can be put back in 2 hours and 20 minutes." The present experimental data indicates that the above controller operates in a comperable fashion, and will automatically and safely accomplish charging in about 2½ hours — as has previously been done with manual control. This is a considerable saving in skilled manpower. It is also considerably better than the usual overnight charge method, especially if one needs to use the batteries during the night.

A Method For Constructing A doubly Responsive Charging System

The foregoing parts of this section 4.6 have set forth the approach and a specific example of a doubly responsive charging controller for charging a lead-acid storage battery. This more complete statement supplements the more general descriptive matter given in section 4.2 and other parts of this specification.

A good battery charger is constructed to match the batteries to be charged and the transducer used to govern the charging action. No one charger will economically match all batteries. So the object of this section is to summarize this teaching by stating a general method for constructing an automatic battery charger which is fast and safe.

The battery to be charged is provided with a transducer — if necessary, a portable one which is designed to be temporarily inserted in whatever battery is currently on charge — the one shown in FIG. 4 will suffice — having a potential output which is a measure of charge state of the battery, and a resistance which is a measure of the temperature state of the battery.

A matching and calibrated controller and controlled source of charging current are connected to the battery and transducer to form a proportional closed loop system constructed and calibrated so that:

an initial charging current is automatically applied which is about as great as the maximum safe current, and is thereafter automatically reduced as charge and temperature increase, but held up near the maximum safe value under the existing conditions until charge is complete, and the current is then turned off or reduced to such a low value that it is not harmful.

To do this, the controller automatically determines both the charge state and temperature state of the battery from the electric potential and resistance of the transducer, and sends a signal to the controlled source of charging current which causes a reduction in charging current proportional to the greater one of two battery states — charge or temperature. There is no known reason for requiring that the overall action be linear, and there may be an advantage in a non-linear system. But it is preferred that the charging current be controlled in graduated steps or in a generally proportional manner.

It will be recognized that there are many ways to construct this type of system. One way is to include the transducer in a bridge which is sequentially and periodically passive or connected to a voltage source, to store a measure of the passive output, and subtract it from a measure of the voltage state output and store the result, thereby providing a stored measure of only the potential and another stored measure of only the resistance, and to thereafter compare the stored measures, and govern the action of the controlled source of charging current with only the greater of the two stored measures.

The result of the use of this linear logical OR approach is that the charging current is limited to a nonharmful value under all forseen conditions, and the charging current is increased so that it is nearly as great as can be absorbed by the battery without harmful effects such as excess gassing or overheating or overcharging.

This provides for charging the battery in a minimum time, and thereby increases the useful availability of both battery and charging equipment.

Control Of Chemical Reagent Strength

It will be apparent that this same general approach, and similar apparatus, can be used to control the concentration and temperature of a chemical reagent in a pipe or mixing vat.

For example, a chemical process may require that sulphuric acid be furnished at a concentration dependent on the temperature of the acid. The transducer and controller of FIG. 10 can be used to provide a potential $e_{xs}$ across capacitor $C_9$ which is a measure of sensed acid strength. This can be amplified using a circuit similar to the GAIN circuits of FIG. 10, and connected to the inputs of power amplifying transconductances, which in turn govern the action of valves controlling the injection of water or strong acid to hold the strength at the required level. A thermal signal can be injected to meet system requirements by linear addition or by a logical OR type of overriding control, using the present approach or other known techniques.

Equipment can be constructed to meet the requirements of a great variety of chemical processes involving control of reagent concentration and temperature, once it is appreciated that the transducer and controller of FIG. 10 independently senses, and provides separate potentials $E_{xs}$ and $E_{TS}$, which are independent measures of concentration and temperature, and that they may be applied separately, or in combination to controlled current sources which in turn govern the action of valves, heaters, pressure controllers, etc. And it is often desireable and practical to construct the component parts so as to operate in a closed loop system.

I have fully described my invention and illustrated its use in preferred embodiments, but I do not wish to be limited to these specific methods and means. Many others will be apparent to those skilled in the art, so I wish to be limited only by the scope of the appended claims.

The invention lies in the method and means for obtaining an electric potential, proportional to a difference in concentration between two similar electrolytes, which are joined by a related electrolyte contained so that the similar electrolytes ordinarily do not mix; and also in the method and means for obtaining an electrical resistance which is proportional to the resistivity of the joining electrolyte, and generally a measure of the temperature of one of the similar electrolytes; and in additional method and means for matching the sensor or transducer to means utilizing its electrical output, including a doubly responsive controller for a charging system.

I claim:

1. A transducer for sensing electrolyte concentration and producing an electric signal potential output proportional to a difference in concentration between a first electrolyte having a first concentration and a second similar electrolyte having a second concentration, comprising in combination;
- a first electrode coupled to a first terminal and having a surface area in contact with said first electrolyte contained in a first container, and
- a second electrode coupled to a second terminal and having a surface area in contact with said second electrolyte contained in a second container, and
- an open joining container having a first end opening into said first container and a second end opening into said second container, and
- adapted by construction means to be filled with an electrolyte to form a joining electrolyte making electrolytic connection with said first electrolyte at said first end and also making electrolytic connection with said second electrolyte at said second end to thereby establish a
- direct electrolytic connection between said first and said second electrolytes so as to permit a measuring current considerably in excess of that conventionally associated with glass membrane half cell usage to flow through said joining electrolyte to said first and second electrolytes and said first and second electrodes to said first and second terminals,
- said open joining container also constructed in elongated form wherein the ratio of the length to the square root of the effective cross-section area is greater than 10 so as to generally prevent mixing by unintentional passage therethrough of said first and said second electrolytes so that neither said first nor said second concentration is altered by more than an allowable amount during the useful life of said transducer.

2. A transducer as claimed in claim 1, wherein said first and said second electrolytes are strong, and
- said first and said second electrodes are constructed using the same basic active material.

3. A transducer as claimed in claim 1, wherein
- said first and second and joining electrolytes are sulphuric acid of generally differing concentrations such as may be found in a lead-acid storage battery in various states of charge and discharge, and said first and second electrodes are constructed using sponge lead.

4. A transducer as claimed in claim 1 in combination with electrode cover protection means generally constructed and arranged with respect to both said first and second electrodes to protect them from excessive exposure to at least one of the hazards which include gas, contaminants, precipitates and the adverse effects which may result from the free washing of at least one of said first and second electrolytes over said electrodes.

5. A transducer as claimed in claim 1 in combination with electrode and open joining container end shield protection means constructed and arranged with respect to both said first and second electrodes and the proximate of said ends of said open joining container to therewith shield and protect said electrodes together with said end to thereby
- substantially reduce an extraneous potential across said terminals in the event of a large electric current in at least one of said first and second electrolytes.

6. A transducer as claimed in claim 1 in combination with measuring current path protection means provided to protect against interruption of said measuring current as a result of at least one of the several hazards which include gas, contaminants, precipitates, and also include a change in the volume of at least one of said first and second electrolytes, and further include a change in the physical orientation of said transducer with respect to a gravity field, said path protection means comprising direct and positive structure constructed in the vicinity of at least one of said first and second ends of said open joining container to thereby protect said path from said at least one hazard by extending at least part way into said joining electrolyte and also into said at least one electrolyte.

7. A transducer as claimed in claim 1 in combination with construction means to cause an electric current having a unidirectional average value to flow in at least one of said electrodes to the proximate of said first and second electrolytes in a path which does not include said joining electrolyte in said open joining container
- so as to thereby largely overcome the deleterious effect of a discharge of said at least one electrode.

8. A transducer having an electric potential output proportional to a difference in concentration as claimed in claim 1, in combination with means whereby said
- transducer is also adapted to have an electrical resistance across said terminals, herein called terminal resistance, which is a definite and reproducable measure of the temperature of at least one of said first and second electrolytes, wherein:
- said means include construction of at least one of said open joining container and said first and second containers to have generally stable and reproducable physical and electrical characteristics insofar as they relate to said terminal resistance, and
- construction to contain at least one of said joining and first and second electrolytes in a manner such that said terminal resistance is generally proportional to the electrical resistivity of said at least one electrolyte, and
- construction of said at least one container to be thermally coupled to at least one of said first and second electrolytes, and
- since it is observed in nature that the electrical resistivity of most electrolytes is a function of temperature,
- said terminal resistance is thereby a measure of the temperature of said at least one electrolyte.

9. A transducer for sensing electrolyte concentration and producing an electric signal potential output proportional to a difference in concentration between a first electrolyte having a first concentration and which may have large electric current flowing therein and a second similar electrolyte having a second concentration, comprising in combination;
- a first electrode coupled to a first terminal and having a surface area in contact with said first electrolyte in a first container, and
- a second electrode coupled to a second terminal and having a surface area in contact with said second electrolyte in a second container, and
- a joining container having a first end opening into said first container and a second end opening into said second container, and
- construction means whereby said first electrode is positioned in close proximity with and directly opposite said first end of said joining container so as to
- thereby substantially reduce an extraneous potential across said terminals in the event of said large electric current in said first electrolyte, said joining container adapted by construction means to be filled with an electrolyte to form a joining electrolyte making contact with and electrolytically connecting said first and second electrolytes so as to permit a measuring current to flow through said joining electrolyte and said first and second electrolytes to said first and second electrodes and said first and second terminals under the stimulus of said potential, said joining container also having construction means to generally prevent mixing by unintentional passage therethrough of said first and said second electrolytes so that thereby neither said first nor said second concentration is altered by more than an allowable amount during the useful life of said transducer.

10. A transducer as claimed in claim 9 in combination with battery state indicating means for showing the state of a storage battery, wherein said transducer is constructed and arranged with said battery so that said output potential is a measure of said state, and a state indicator is provided, constructed and matched to said transducer to show said state, and said first electrode in said first electrolyte is generally exposed to an electrolyte in said battery, and said first electrode and said first end of said joining container are together protected by cover means from the damaging effect of at least one of the hazards of exposure to battery electrolyte which include gas, contaminants, precipitates, and said second electrolyte and said second electrode and the said second end of said joining container are together protected by cover and shield means from the effects of said current in said battery electrolyte and also together protected from alteration by said battery electrolyte by being together fully enclosed in said second container.

11. A transducer as claimed in claim 9 in combination with battery state indicating means for showing the state of a storage battery, said transducer further constructed, arranged and coupled to said indicating means and to said battery so that said state showing is corrected for the effect of temperature on the characteristics of said battery, wherein said first electrode in said first electrolyte is generally exposed to an electrolyte in said battery, and at least one of said joining container and said first container and said second container is designed and constructed to be generally stable and to contain at least one of said joining and said first and said second electrolytes in a manner such that the electrical resistance across said terminals, herein called terminal resistance, is generally proportional to the electrical resistivity of said at least one electrolyte, and said at least one container is thermally coupled to said battery electrolyte so that thereby said at least one electrolyte is thermally coupled to said battery electrolyte, so that thereby said terminal resistance is a measure of the temperature of the said battery electrolyte, and said transducer and said state indicating means are constructed and coupled one to the other and to said battery electrolyte in a manner such that an increase in the concentration of said battery electrolyte generally results in an increase in said potential output and this in turn generally causes the showing of an increased state of said battery, and also a decrease in the temperature of said battery electrolyte generally results in an increase in said terminal resistance and this in turn generally causes the showing of a decreased state of said battery, 12. A transducer as claimed in claim 9 in combination with charging means to form a closed loop system for charging a storage battery with a charging current, wherein said transducer is constructed and arranged with said storage battery so that said output potential is a measure of the charge state of said battery, and said charging means include a controller which is constructed, arranged and coupled to said transducer so that said output potential directs the action of said controller in a manner such that an increase in said charge state generally results in a reduction of said charging current to said battery, and said first electrode in said first electrolyte is generally exposed to an electrolyte of said battery, and direct and positive means are provided to protect the path of said measuring current at least in the vicinity of said first end of said joining container proximate to said first electrode from at least one of the hazards including gas, contaminants and precipitates, and cover and shield means are also provided to protect said second electrolyte together wtih said second electrode together with said second end of said joining container from the effects of said charging current in said battery electrolyte and to also protect them from alteration by said battery electrolyte by together fully enclosing them in said second container.

13. A transducer as claimed in claim 9 in combination with charging means to form a closed loop system for more rapidly charging with a charging current a storage battery having an electrolyte, said transducer also constructed, arranged and coupled to said charging means constructed so that said charging current is generally large when said battery is discharged and also said battery electrolyte is cool, and said charging current is diminished generally in proportion to the greater of a signal derived from said potential output — or — a thermal signal derived from an increase in the temperature of said battery electrolyte, wherein said transducer is constructed and arranged with said storage battery so that said output potential is a measure of the charge state of said battery, and said first electrode in said first electrolyte is generally exposed to said battery electrolyte, and at least one of said joining container and said first and second containers is constructed to be generally stable and contain at least one of said joining and said first and second electrolytes in a manner such that the electrical resistance across said terminals, herein called terminal resistance, is generally proportional to the electrical resistivity of the said at least one electrolyte, and said at least one container is thermally coupled to said battery electrolyte so that thereby said at least one electrolyte is thermally coupled to said battery electrolyte, so that thereby said terminal resistance is a measure of the temperature of the said battery electrolyte, and said charging means include a doubly responsive controller which is constructed, arranged and coupled to said transducer so that said terminal resistance governs said terminal signal, and thereby said charging current is diminished generally in proportion to the greater of a charge state signal derived from said output potential — or — said thermal signal derived from an increase in said temperature of said battery electrolyte.

14. A transducer as claimed in claim 9 in combination with means to compensate for discharge of at least one of said first and said second electrodes, comprising means adapted to cause a charging current to flow in said at least one electrode to the proximate of said first and second electrolytes and provide for said potential output proportional to said difference in concentration.

15. A transducer as claimed in claim 9 in combination with signal amplification means for coupling and matching said transducer to means utilizing said electric signal potential output, wherein construction means are included whereby at least one of said first and second and joining container have an elongated form with a ratio of length to the square root of effective cross-section area greater than ten so that thereby the electrical resistance across said transducer terminals is caused to be great enough to impede the flow of said measuring current to the extent that said means utilizing may not give effective performance when coupled and matched to said transducer terminals without signal amplification means, and wherein said signal amplification means are incorported into said combination and matched and coupled to said transducer and adapted to said utilization means to provide for said effective performance, and said signal amplification means include a source of power having two lugs and also include an amplifier constructed with at least two semiconductor amplification and signal inverting devices connected in circuit combination so that said amplifier has an input post coupled to said first transducer terminal, and an output post adapted to be coupled to said means utilizing, and a reference post coupled to a first one of said two power lugs, and the second one of said two power lugs is coupled to a first one of said devices having an input pin coupled to said input post, and a common pin coupled to said output post, and an output pin coupled to an input lead of a second one of said devices having an output lead coupled to said output post and a common lead coupled to said reference post, and reference coupling means are provided to couple said reference post to at least one of said first and second transducer terminals so that thereby such common mode voltage as may be required for proper operation is included in said reference coupling means.

* * * * *